US006850735B2

(12) United States Patent
Sugar et al.

(10) Patent No.: US 6,850,735 B2
(45) Date of Patent: Feb. 1, 2005

(54) SYSTEM AND METHOD FOR SIGNAL CLASSICIATION OF SIGNALS IN A FREQUENCY BAND

(75) Inventors: Gary L. Sugar, Rockville, MD (US); Neil R. Diener, Rockville, MD (US); Karl A. Miller, Frederick, MD (US)

(73) Assignee: Cognio, Inc., Gaithersburg, MD (US)

( * ) Notice: Subject to any disclaimer, the term of this patent is extended or adjusted under 35 U.S.C. 154(b) by 95 days.

(21) Appl. No.: 10/246,364

(22) Filed: Sep. 18, 2002

(65) Prior Publication Data

US 2004/0203826 A1 Oct. 14, 2004

Related U.S. Application Data

(60) Provisional application No. 60/319,542, filed on Sep. 11, 2002, provisional application No. 60/319,435, filed on Jul. 30, 2002, provisional application No. 60/380,890, filed on May 16, 2002, provisional application No. 60/380,891, filed on May 16, 2002, provisional application No. 60/374,363, filed on Apr. 22, 2002, and provisional application No. 60/374,365, filed on Apr. 22, 2002.

(51) Int. Cl.$^7$ ............................................... H04B 17/00
(52) U.S. Cl. .................................. 455/67.11; 455/115.1; 455/226.1; 375/224; 375/340
(58) Field of Search ............................ 455/67.11, 115.1, 455/115.2, 115.3, 115.4, 176.1, 179.1, 180.1, 226.1; 375/224, 340

(56) References Cited

U.S. PATENT DOCUMENTS

| | | | | |
|---|---|---|---|---|
| 3,609,553 A | | 9/1971 | Frazier et al. .................. | 325/67 |
| 3,812,291 A | * | 5/1974 | Brodes et al. ............... | 704/253 |
| 4,166,980 A | | 9/1979 | Apostolos et al. ........... | 325/363 |
| 4,227,255 A | | 10/1980 | Carrick et al. ............ | 455/226.1 |
| 4,271,523 A | | 6/1981 | Gable ........................... | 371/57 |
| 4,501,020 A | | 2/1985 | Wakeman .................... | 455/226 |
| 4,597,107 A | * | 6/1986 | Ready et al. ............. | 455/226.1 |
| 4,845,707 A | | 7/1989 | Isaacson et al. ............. | 370/480 |
| 4,947,338 A | | 8/1990 | Vistica ........................ | 364/485 |

(List continued on next page.)

FOREIGN PATENT DOCUMENTS

| | | | |
|---|---|---|---|
| CA | 2260336 | 8/2000 | ........... C01R/29/26 |
| CA | 2298316 | 8/2000 | ............ H04B/1/16 |
| JP | 2000-022712 | 1/2000 | |

OTHER PUBLICATIONS

Allowed claims from related U.S. Patent Application No. 20030198304A1.

(List continued on next page.)

Primary Examiner—Simon Nguyen
(74) Attorney, Agent, or Firm—D. Andrew Floam, Esq.

(57) ABSTRACT

A system and method for classifying signals occurring in a frequency band. One or more characteristics of one or more signals in the frequency band are detected using any suitable technology, such as a device that can generate characteristics of signal pulses detected in the frequency band. Data pertaining to the signal pulses is accumulated over time. The accumulated signal data is compared against reference data associated with known signals to classify the one or more signals in the frequency band based on the comparison. The accumulated data may include one or more characteristics selected from the group consisting of: pulse center frequency, pulse bandwidth, pulse duration, time between pulses and number of different active pulses, and wherein the reference data associated with each of a plurality of known signals comprises one or more characteristics selected from the group consisting of: pulse center frequency, pulse bandwidth, pulse duration and time between pulses. The accumulated signal data is compared against the reference data, and depending on the degree of match with reference data, a signal can be classified. Additional levels of signal classification processing may be performed.

58 Claims, 16 Drawing Sheets

U.S. PATENT DOCUMENTS

| | | | | |
|---|---|---|---|---|
| 4,979,211 | A | | 12/1990 | Benvenuto et al. ............ 381/43 |
| 5,005,210 | A | | 4/1991 | Ferrell ......................... 455/115 |
| 5,144,642 | A | | 9/1992 | Weinberg et al. ............. 375/10 |
| 5,210,820 | A | | 5/1993 | Kenyon ........................ 395/2 |
| 5,353,346 | A | | 10/1994 | Cox et al. .................... 379/386 |
| 5,432,862 | A | | 7/1995 | Hirsch ......................... 382/207 |
| 5,608,727 | A | | 3/1997 | Perreault et al. ............ 370/462 |
| 5,651,030 | A | | 7/1997 | Wong et al. ................. 375/316 |
| 5,687,163 | A | * | 11/1997 | Fox et al. .................... 370/207 |
| 5,832,038 | A | | 11/1998 | Carsello ....................... 375/216 |
| 5,905,949 | A | | 5/1999 | Hawkes et al. .............. 455/410 |
| 5,912,922 | A | | 6/1999 | Koszarsky et al. ......... 375/224 |
| 6,084,919 | A | | 7/2000 | Kleider et al. .............. 375/285 |
| 6,240,282 | B1 | * | 5/2001 | Kleider et al. ............ 455/226.1 |
| 6,240,372 | B1 | * | 5/2001 | Gross et al. ................... 702/71 |
| 6,385,434 | B1 | | 5/2002 | Chuprun et al. ............ 455/11.1 |
| 6,463,294 | B1 | | 10/2002 | Holma et al. ............... 455/513 |
| 6,466,614 | B1 | * | 10/2002 | Smith ......................... 375/224 |
| 6,519,541 | B1 | | 2/2003 | Bitton .......................... 702/76 |
| 2001/0019543 | A1 | | 9/2001 | Mueckenheim et al. |
| 2002/0086641 | A1 | | 7/2002 | Howard ...................... 455/67.1 |
| 2002/0137485 | A1 | | 9/2002 | Nilsson et al. ........... 455/184.1 |
| 2002/0142744 | A1 | | 10/2002 | Okanoue et al. ......... 455/226.1 |
| 2002/0154614 | A1 | | 10/2002 | Jagger et al. ................ 370/332 |
| 2002/0155811 | A1 | | 10/2002 | Prismantas et al. ........... 455/63 |
| 2002/0173272 | A1 | | 11/2002 | Liang et al. ................... 455/63 |
| 2003/0040277 | A1 | | 2/2003 | Deats ........................... 455/63 |
| 2003/0050012 | A1 | | 3/2003 | Black et al. ................... 455/62 |
| 2003/0123420 | A1 | | 7/2003 | Sherlock ..................... 370/338 |
| 2003/0198200 | A1 | | 10/2003 | Diener et al. ............... 370/329 |
| 2003/0198304 | A1 | | 10/2003 | Sugar et al. ................. 375/340 |
| 2003/0224741 | A1 | | 12/2003 | Sugar et al. ............. 455/115.1 |
| 2004/0023674 | A1 | | 2/2004 | Miller ......................... 455/462 |
| 2004/0028003 | A1 | | 2/2004 | Diener et al. ............... 370/319 |
| 2004/0028123 | A1 | | 2/2004 | Sugar et al. ................. 375/224 |

OTHER PUBLICATIONS

"A Practical Approach to Identifying and Tracking Unauthorized 802.11 Cards and Access Points," Interlink Networks, 2002.

AiroPeek and Wireless Security: *Identifying and Locating Rogue Access Points*, WildPackets, Inc., 2002.

"Verifying Bluetooth™ Baseband Signals Using Mixed–Signal Oscilloscopes," Agilent Technologies, Inc., 2001.

"Oscor 5000 (Omni–Spectral Correlator)," date unknown.

Howitt et al., "Coexistence in the 2.4 GHz ISM Band," date unknown.

"Using Signal Processing to Analyze Wireless Data Traffic," BBN Technical Memorandum No. 1321, Job No. 1264054, May 22, 2002.

Report: Second Meeting of FCC Technological Advisory Council II, FCC TAC, Nov. 28, 2001, pp. 1–27.

Taira, Shintaro, et al, "Automatic Classification of Analogue Modulation Signals by Statistical Parameters," Proceedings of 1999 Military Communications International Symposium MILCOM Conference Proceeding (MILCOM 1999), Mar. 1999.

Ketterer, Helmut et al., "Classificcation of Modulation Modes Using Time–Frequency Methods," Proceedings of the IEEE International Conference on Acoustics, Speech and Signal Processing, Mar. 1999.

Boudreau, Daniel et al., "A Fast Automatic Modulation Recognition Algorithm and Its Implementation in a Spectrum Monitoring Application," Proceedings of 2000 Military Communications International Symposium (MILCOM 2000), Oct., 2000.

Noone, Gregory P., "A Neural Approach to Automatic Pulse Repetition Interval Modulation Recognition," Proceedings of Information Decision and Control, 1999, pp. 213–218.

Logicon Product Information "Logicon Specific Emitter Identification," 2 pages, date unknown.

Tutorial C "Automatic Signal Classification," European Association for Signal Processing, Sep., 1998, 2 pages.

Nolan, Keith E., et al., "Modulation Scheme Classification for 4G Software Radio Wireless Networks," Proceedings of the International Conference on Signal Processing, Pattern Recognition and Applications (SPPRA, 2002), pp. 25–31.

Nolan, Keith E., et al., "Modulation Scheme Recognition Techniques for Software Radio on a General Purpose Processor Platform," Proceedings of First Joint IEI/IEEE Symposium on Telecommunication Systems Research, Nov., 2001.

Hans–Joachim Kolb, "Short Time Spectrum Analysis of Audio Signals on a PC," publication of MEDAV Digitale Signalverarbeitung GmbH, date unknown.

Hans–Joachim Kolb, "Signal Processing and Neural Networks in Surveillance and Radio Monitoring," publication of MEDAV Digitale Signalverarbeitung GmbH, Special excerpt for the lecture series Information Technology and the Armed Forces, ETH Zurich, 1993.

OC–6040 PC–Based 4–Channel Analyser and Demodulator for Narrowband COMINT Signals with Automatic Signal Recognition and Text Decoding Capability, publication of MEDAV Digitale Signalverarbeitung GmbH, date unknown.

ASTRID Analysis System for Telecom Signals, Recognition, Interception and Demodulation of HF/VHF/UHF Radio Signals from 0 to 2 GHz, publication of MEDAV Digitale Signalverarbeitung GmbH, date unknown.

ASTRID++ Analysis, Monitoring, Recording and Multi-–Channel Direction Finding of Wideband Radio Signals, publication of MEDAV Digitale Signalverarbeitung GmbH, date unknown.

SPECTRO–KIT Online Spectrogram Analysis on a PC, publication of MEDAV Digitale Signalverarbeitung GmbH, date unknown.

DSP–Kit MATLABTM–Toolbox for Real–Time Measurement Acquisition, publication of MEDAV Digitale Signalverarbeitung GmbH, date unknown.

Agilent Publication, "Agilent 89400 Series Vector Signal Analyzer Product Overview," 2000.

Agilent Publication, "Agilent Technologies: 2 G & 3g Solutions–Accelerating Progress," 2002.

Agilent Publication, "Agilent Technologies: Power Solutions To Complex Measurement Problems; Burst, Transient and Modulated Signal Analysis," 2000.

Agilent Publication, "Agilent PN 89400–8 Using Vector Modulation Analysis In The Integration, Troubleshooting And Design Of Digital Rf Communications Systems," 2000 (and earlier).

Agilent Publication, "Agilent PN 89400–10 Time–Capture Capabilities Of The Agilent 89400 Series Vector Signal Analyzers," 2000 (and earlier).

Agilent Publication, "Agilent 89440A–1 Frequency And Time–Selective Power Measurements With The Agilent 89410a And 89440a," 2001 (and earlier).

Canadian Communications Research Center, "Spectrum Explorer Project Of Canadian Communications Research Center," 1998 (and later).

Stanford Research Systems, "Stanford Research Systems SR785 Two Channel Dynamic Signal Analyzer," 1998.

Carlemalm, Catharina, "Suppression Of Multiple Narrowband Interferers In A Spread–Spectrum Communication System," Aug., 2000, IEEE Journal on Selected Areas in Communications, Special Issue on Broadband Communications, vol. 18.

Lo, Victor Yeeman, "Enhanced Spectral Analysis Tool (SAT) For Radio Frequency Interference Analysis And Spectrum Management," Milcom, 1998.

Tektronix, "Real–Time Spectrum Analysis Tools Aid Transition To Third–Generation Wireless Technology," 1999.

Patenaude, Francois et al., "Spectrum Surveillance: System Architecture," CRC–TN–97–001, Canadian Communications Research Centre, Apr. 15, 1997.

Mobilian Corporation, "WI–FI™ (802.11b) and Bluetooth™: an Examination of Coexistence Approaches", Mobilian Corporation, 2001.

RSMS Publication, "Radio Spectrum Measurement System (RSMS) Program–Functional Measurements", Jan. 29, 2001, 5 pages.

Schreyogg, Christoph et al., "Robust Classification Of Modulation Types Using Spectral Features Applied To HMM", 1997, 5 pages.

Tektronix, "Validation Testing Of Bluetooth Wireless LAN Systems", Tektronix Application Note, 2001.

Lallo, Pauli, "Signal Classification By Discrete Fourier Transform", Milcom Conference Proceedings, 1999.

Quint et al., "Emitter Detection And Tracking Algorithm For A Wide Band Multichannel Direction–Finding System In The HF Band", Milcom Conference Proceedings, 1999.

Dubuc et al., "An Automatic Modulation Recognition Algorithm For Spectrum Monitoring Applications", ICC '99, Jun. 19, 1999.

Shull et al., "Modulation Classification By Wavelet Decomposition Entropy Analysis1", ASME Press, vol. 10, 99 15–20, Nov., 2000.

* cited by examiner

FIG. 7
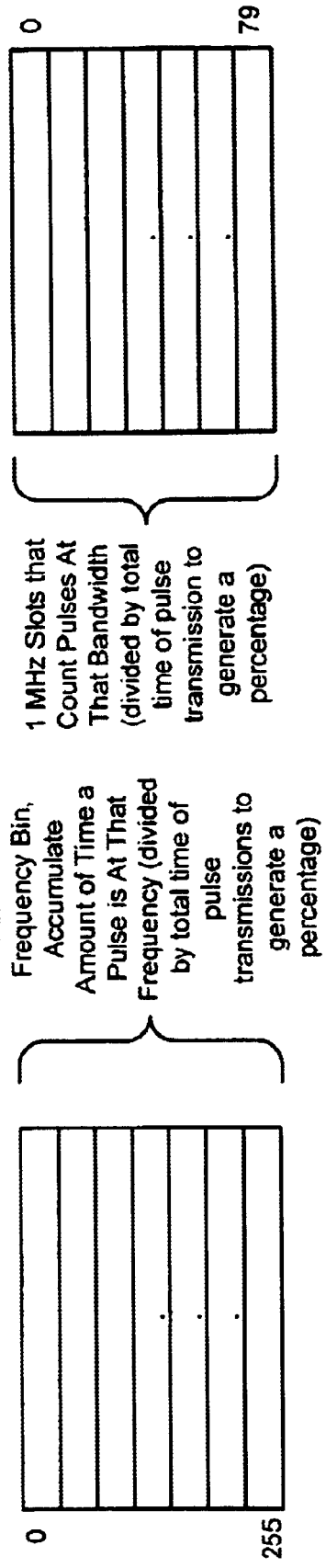
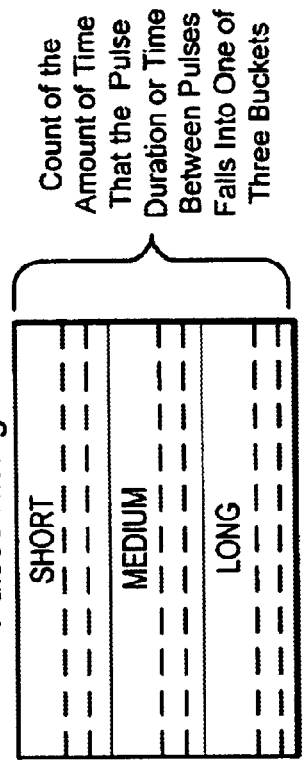
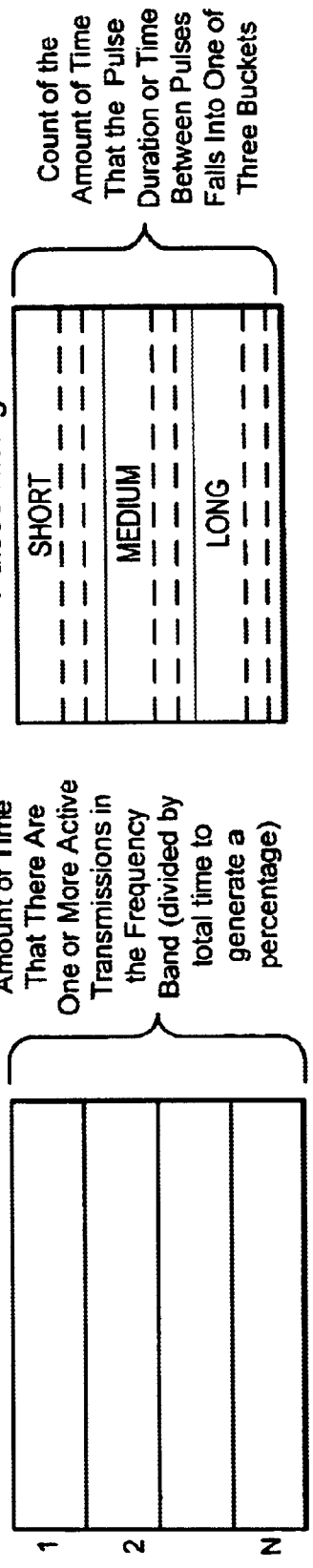

FIG. 8
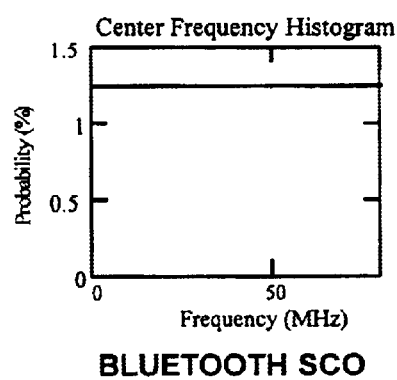
BLUETOOTH SCO
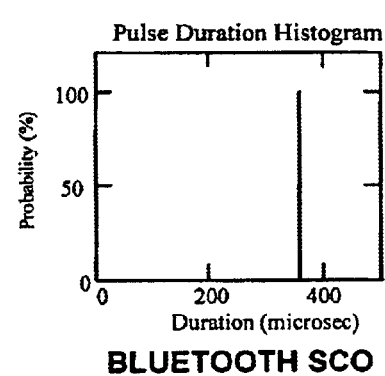
BLUETOOTH SCO
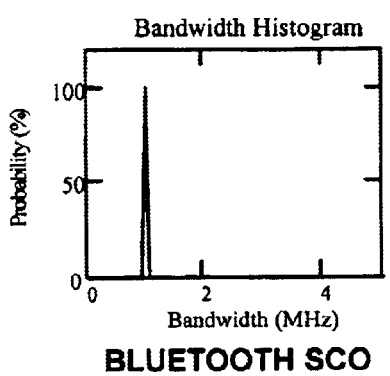
BLUETOOTH SCO
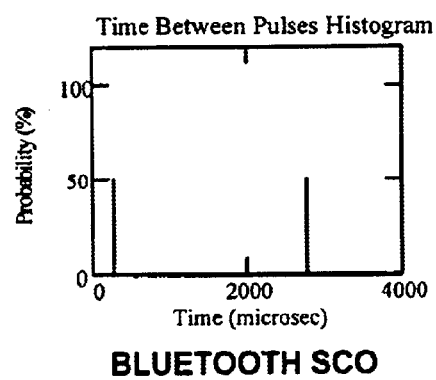
BLUETOOTH SCO

FIG. 9
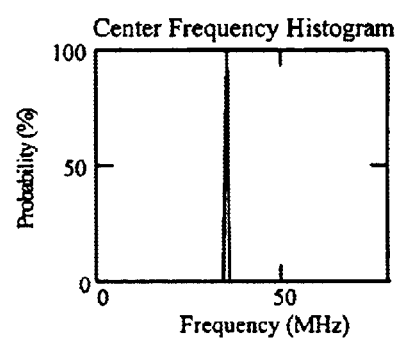
MICROWAVE OVEN
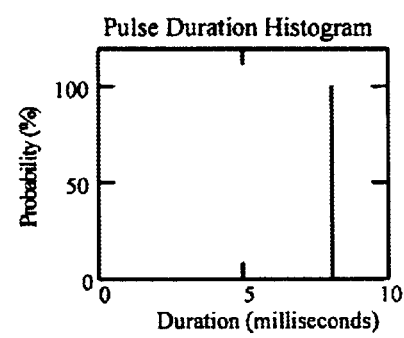
MICROWAVE OVEN
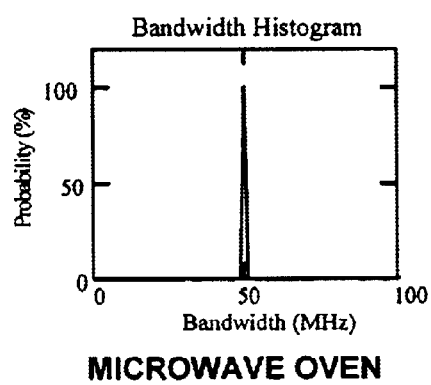
MICROWAVE OVEN
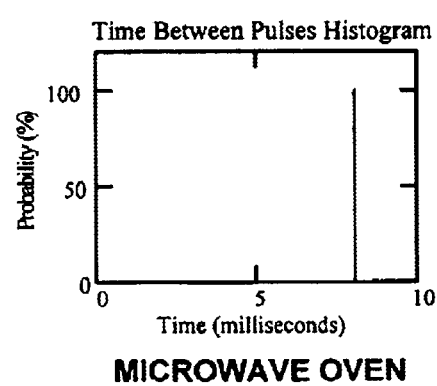
MICROWAVE OVEN FIG. 10
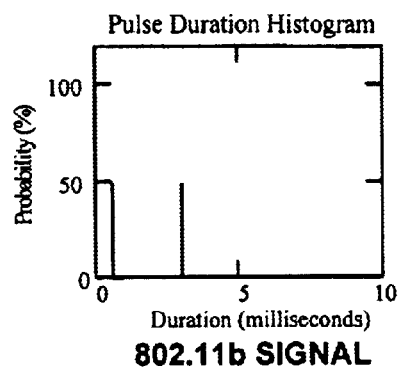
802.11b SIGNAL
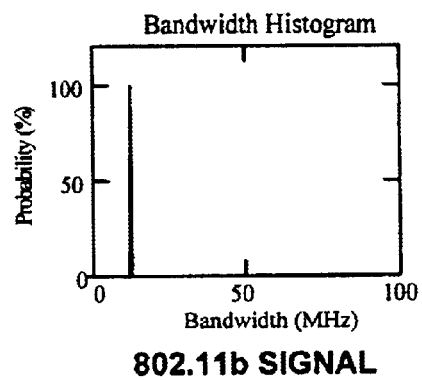
802.11b SIGNAL
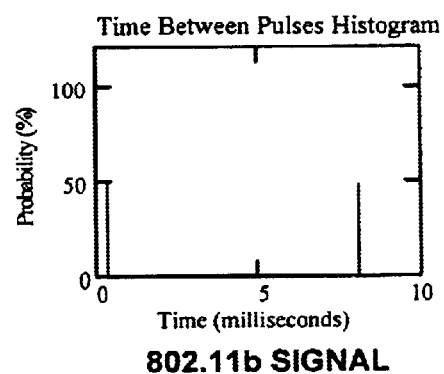
802.11b SIGNAL

SYSTEM AND METHOD FOR SIGNAL CLASSICIATION OF SIGNALS IN A FREQUENCY BAND

This application claims priority to each of the following U.S. Provisional Applications, all of which are incorporated herein by reference:

Application No. 60/374,365, filed Apr. 22, 2002.
Application No. 60/374,363, filed Apr. 22, 2002.
Application No. 60/380,891, filed May 16, 2002.
Application No. 60/380,890, filed May 16, 2002.
Application No. 60/319,435, filed Jul. 30, 2002.
Application No. 60/319,542, filed Sep. 11, 2002.

RELATED APPLICATIONS

This application is related to each of the following commonly assigned U.S. Non-Provisional Applications, filed on even date (the entirety of both of which is incorporated herein by reference):

U.S. Application No. 10/246,365, entitled"System and Method for Real-Time Spectrum Analysis in a Communication Device."

U.S. Application No. 10/246,363, entitled"System and Method for Spectrum Management of a Shared Frequency Band."

BACKGROUND OF THE INVENTION

The present invention is directed to radio communication devices, and more particularly to technology used in a radio communication device to classify or identify signals in a radio frequency band.

In certain radio communication systems, it would be desirable to know whether and what types of other signals or devices are active. For example, an unlicensed radio frequency band is, by its nature, free to be used by any device that emits within certain power levels in that part of the allocated spectrum. It is possible that many devices would share the unlicensed frequency band at the same time, potentially causing interference with each other. Under these circumstances, it would be useful to identify or classify signals detected in the frequency band in order to know whether a device should take certain actions to avoid interfering with other devices operating in the frequency band.

SUMMARY OF THE INVENTION

Briefly, a system and method are provided for classifying signals occurring in a frequency band. One or more characteristics of one or more signals in the frequency band are detected using any suitable technology, such as a device that can generate characteristics of signal pulses detected in the frequency band. Data pertaining to the signal pulses is accumulated over time. The accumulated signal data is compared against reference data associated with known signals to classify the one or more signals in the frequency band based on the comparison. The accumulated data may include one or more characteristics selected from the group consisting of: pulse center frequency, pulse bandwidth, pulse duration, time between pulses and number of different active pulses, and wherein the reference data associated with each of a plurality of known signals comprises one or more characteristics selected from the group consisting of: pulse center frequency, pulse bandwidth, pulse duration and time between pulses. The accumulated signal data is compared against the reference data, and depending on the degree of match with reference data, a signal can be classified. Additional levels of signal classification may include generating a pulse timing signature for each signal pulse and comparing that pulse timing signature with reference pulse timing signatures associated with known signals. Further, samples of the signals themselves can be taken and examined to classify the signal. Further still, classification may involve iterating through a plurality of different signal characteristics to detect signals that meet one or more of the plurality of different signal characteristics.

The above and other objects and advantages will become readily apparent when reference is made to the following description taken in conjunction with the accompanying drawings.

BRIEF DESCRIPTION OF THE DRAWINGS

FIG. 7 illustrates examples of accumulated signal pulse data used by the signal classification process.

FIGS. 8–11 illustrate histograms of signal pulse characteristics of several exemplary signals that may occur in an unlicensed radio frequency band.

DETAILED DESCRIPTION OF THE DRAWINGS

Figure 1:
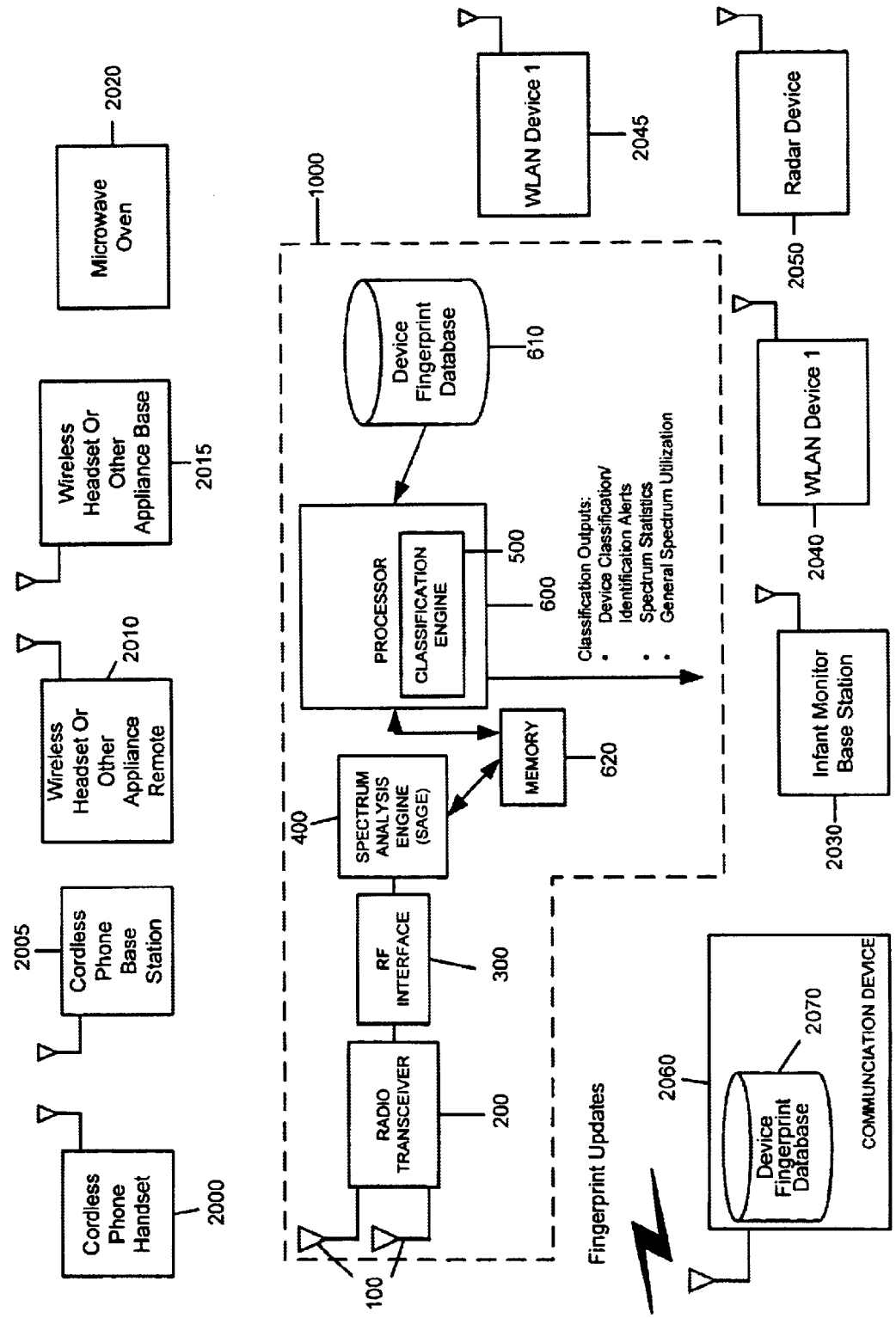
FIG. 1 is a block diagram showing a general environment for a signal classification system and method.

FIG. 1 shows a general environment for a signal classification system and method. A wireless communication device 1000 operates in an environment, such as an unlicensed radio frequency band, where signals from other devices sharing the same frequency band may be present. Examples of other devices sharing the unlicensed frequency band with communication device 1000 are, for example, a cordless phone handset 2000 and cordless phone base station 2005, a wireless headset or other appliance remote 2010 and its base station 2015 (such as a device using the Bluetooth™ protocol or a device using the HomeRF™ protocol), a microwave oven 2020, an infant (video and/or audio) monitor base station 2030, a first wireless local area network (WLAN) device 2040 (such as an access point), a second WLAN device 2045 (such as a station) and a radar device 2050. Additional WLAN devices (e.g., stations) may be operating in the frequency band. Device 1000 may be any type of communication device, such as a WLAN device for example. Device 1000 may be in communication, or capable of communicating, with one or both WLAN devices 2040 and 2045.

The communication device 1000 has an RF transceiver 200 coupled to one or more antennas 100. An RF interface 300 is coupled to the radio transceiver 200. A spectrum analysis engine (SAGE) 400 is coupled to the radio transceiver 200. The SAGE 400 is a hardware peripheral that generates real-time spectrum activity information. The output of the SAGE 400 is the raw information used in the classification process. The SAGE 400 will be generally described hereinafter with reference to FIG. 4. It should be understood that any device capable of detecting signals in the frequency band and supplying raw information about those signals can be used in a classification process as described herein.

Though not specifically shown, the SAGE 400 may reside in a baseband section of a communication device in a VLSI implementation. A processor 600 executes a classification software program, called the classification engine 500, stored in a processor readable memory 620. Information used by the classification engine 500 to classify signals may be stored locally in a device fingerprint database 610 (also referred to as a profile or reference database). The concept of a fingerprint will be described hereinafter. In addition, new and updated device fingerprints may be downloaded to the communication device 1000 from another communication device 2060 that stores a more comprehensive and updated database 2070 of fingerprint definitions. The processor 600 executing the classification engine 500 may be an on-chip processor in the baseband section, or may be a host processor external to the baseband section, but in the communication device 1000 itself. Alternatively, the classification engine 500 may be executed on another device entirely separate from communication device 1000, in which case communication device 1000 would transmit raw spectrum information generated by the SAGE 400 via a wireless or wired link to the other device. For example, the classification engine could be executed on a server computer that communicates by wire or wirelessly to communication device 1000. Alternatively, if the communication device 1000 is a WLAN station, it may transmit the raw classification information to WLAN device 2045 which may be an access point with greater processing power and capable of overseeing communications in the WLAN. Data output by the SAGE 400 is stored in a memory 620 that the processor 600 accesses when performing the classification operations. The memory 620 may contain the fingerprint database 610 as well.

The communication device 1000 samples the RF spectrum in which it is operating via the radio transceiver 200. The SAGE 400 receives and processes the RF information from the radio transceiver 200 to output first level spectrum information, described hereinafter. The classification engine 500 processes the first level spectrum information with the use of device fingerprints to output information characterizing the activity in the RF spectrum and which classifieds/identifies devices operating in the spectrum. When a signal is "classified," data that describes the spectral parameters of the signal are determined sufficient to know generally what type of signal it is. The parameters may include the bandwidth, center frequency, frequency hopping rate (if it hops), pulse duration, time between pulses, etc. A signal that is classified can also be "identified" such as by the brand of the chipset that transmits its signal, or perhaps so specific as to identify the brand and model of the device that transmits the signal.

Figure 2:
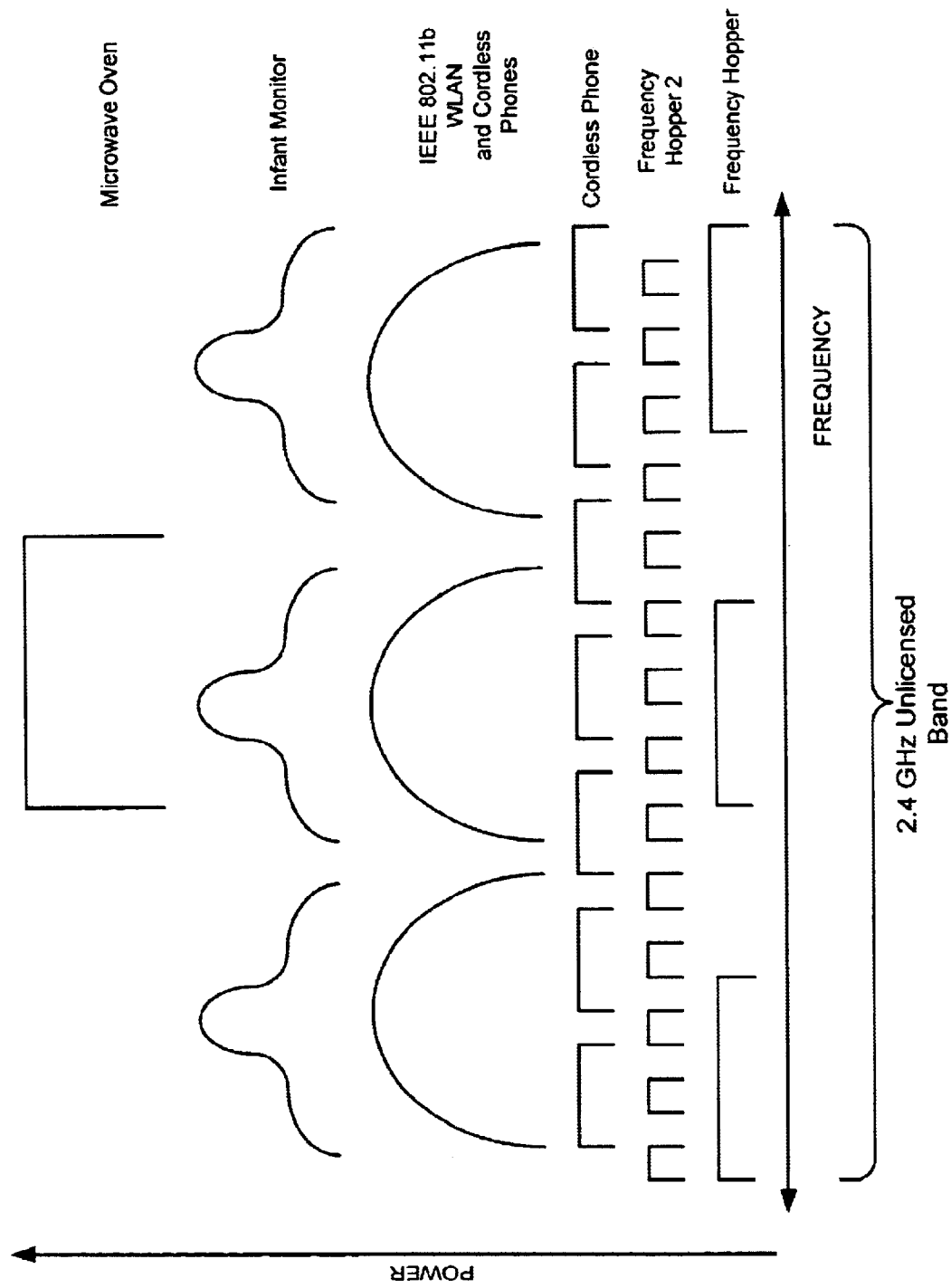
FIGS. 2 and 3 illustrate examples of the types of signals that may be simultaneously present in two exemplary radio frequency bands.
Figure 3:
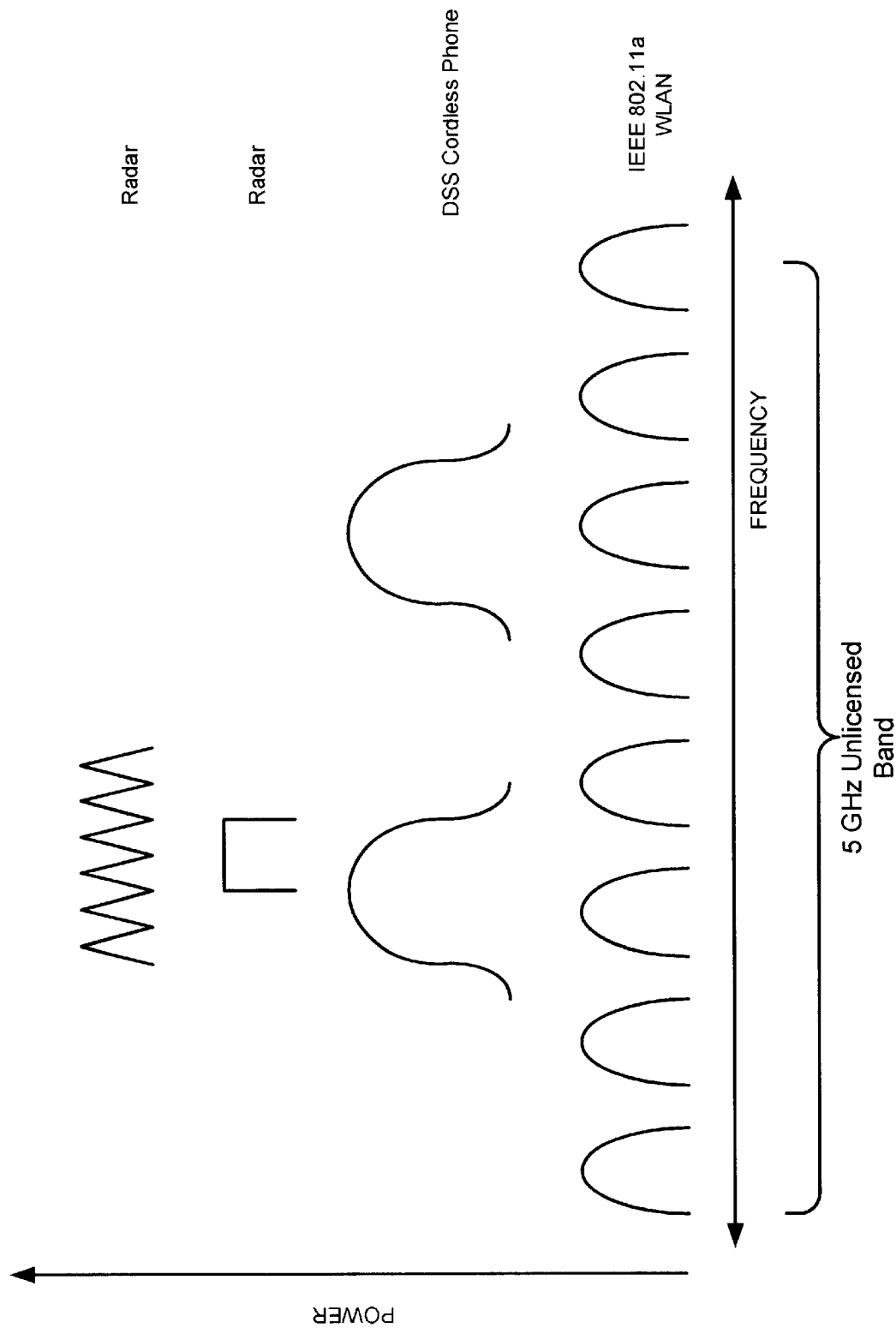

FIGS. 2 and 3 illustrate some examples of the spectral usage of two unlicensed frequency bands in the United States. FIG. 2 shows the spectral profiles of exemplary devices that operate in the 2.4 GHz unlicensed frequency band such as for frequency hopper devices, cordless phones, IEEE 802.11b WLAN communication devices, infant monitor devices and microwave ovens. A frequency hopping device will occupy a predictable or random frequency sub-band at any given time, and therefore, over time, may span the entire frequency band. A cordless phone, of the non-frequency hopping variety, may occupy one of several frequency sub-bands (channels) at any given time. An IEEE 802.11b device will occupy one of several channels in the 2.4 GHz band at any given time, and an infant monitor is similar. A microwave oven will emit a burst of energy that may span a significant portion of the unlicensed band.

FIG. 3 shows a similar set of circumstances for the 5 GHz unlicensed bands. There are actually three unlicensed frequency bands at 5 GHz in the United States. Two of these are contiguous (and are meant to be represented by the diagram in FIG. 3) and the third is not contiguous with the other two (which for simplicity is not considered in FIG. 3). In the 5 GHz unlicensed bands, currently there are IEEE 802.11a WLAN devices operating in one of 8 different frequency sub-bands (channels), direct sequence spread spectrum (DSS) cordless phones, and various radar devices. At the time of this writing, the 5 GHz unlicensed band is relatively new, and not as widely used. However, as history has proven with the 2.4 GHz unlicensed band, greater use of the 5 GHz band is fully expected.

In an unlicensed band, it is inevitable that two or more of these devices will be transmitting at the same time. There is, therefore, a high likelihood that they will interfere with each other. When interference occurs, a signal from one device to another may not be received properly, causing the sending device to retransmit (and therefore reduce throughput), or possibly entirely destroying the communication link between two communication devices. Therefore, being able to classify or identify signals is an important prerequisite to intelligently managing the use of a shared frequency band.

Figure 4:
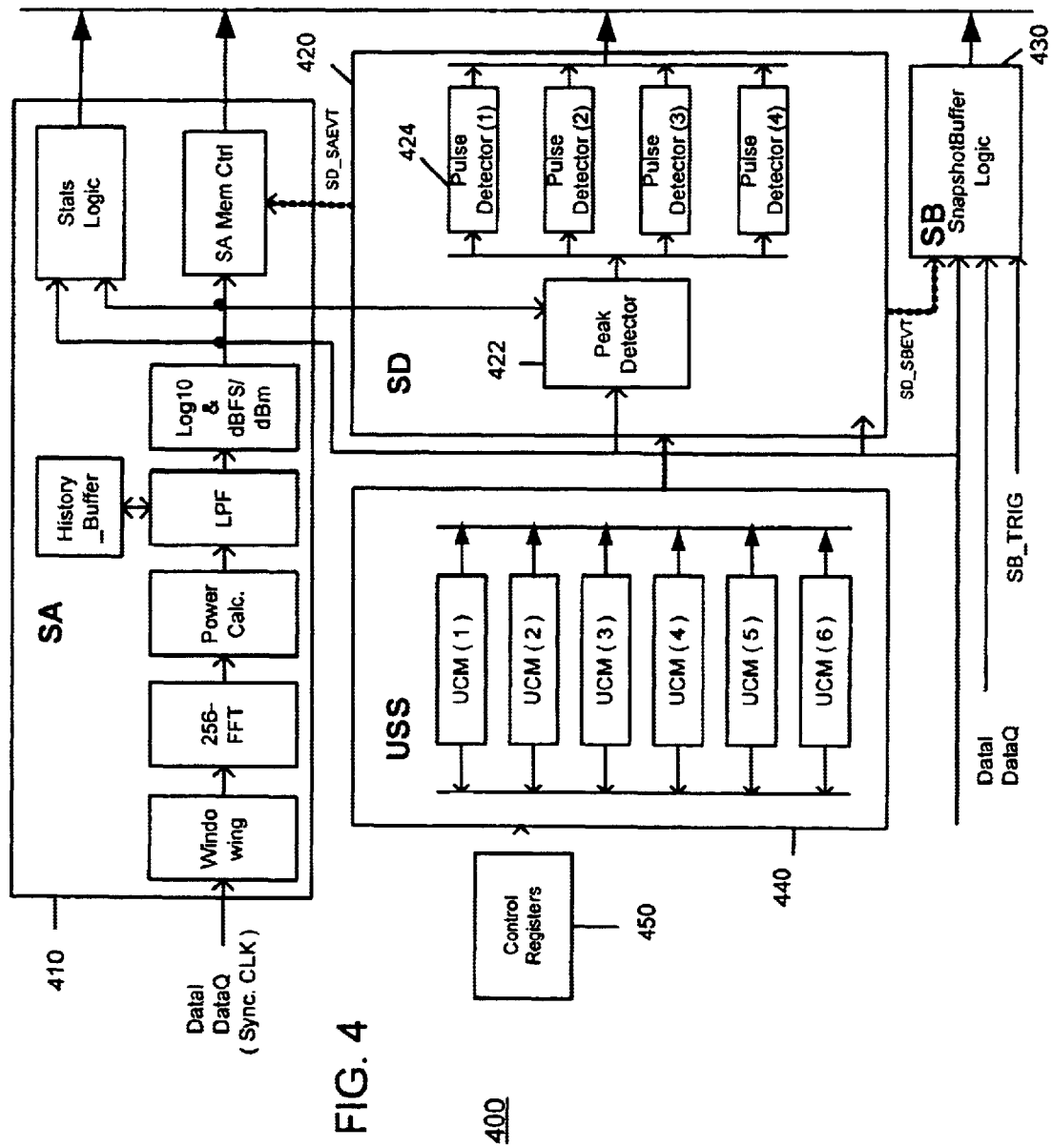
FIG. 4 is a block diagram of an exemplary spectrum analysis device that generates data useful as input to a signal classification process.

With reference to FIG. 4, the SAGE 400 comprises a spectrum analyzer 410, a signal detector 420, a snapshot buffer 430 and a universal signal synchronizer 440. The outputs of these components are coupled to the memory 610 (FIG. 1). The processor 600 accesses the output of the SAGE 400 via the memory 610 and controls the SAGE 400 by writing configuration information to the control registers 450 that configures operation of the SAGE components. More details on the SAGE 400 are disclosed in co-pending commonly assigned referred to above. As described in that application, the signal detector 420 comprises a peak detector 422 and one or more configurable pulse detectors 424 coupled to the peak detector. The processor 600 (or another processor coupled to the processor 600, not shown) configures the one or more pulse detectors to detect signal pulses that fall within ranges of bandwidth, power, center frequency, duration, etc., to detect signal pulses of certain types of signals. If a pulse detector detects a pulse that meets the configured criteria, it outputs signal pulse data for that pulse. The spectrum analyzer 410 outputs duty cycle statistics such as the percentage of time of energy at each frequency in a frequency band and the average power and maximum power at each frequency (for example, at each of the 256 FFT frequency bins processed by the spectrum analyzer 410). A pulse detector 424 in the signal detector 420 can also be configured by the processor 600 to trigger the snapshot buffer to store raw analog-to-digital (ADC) samples of the received signal when a pulse of a particular type is detected. Other devices or processes may be used to generate raw spectrum information useful by a signal classification process.

Consequently, the first level spectrum information may include one or more of:

1. Signal pulse data (called pulse events): a list of pulse center frequencies, bandwidths, power, duration and time between pulses, for pulses detected by each of the pulse detectors.
2. Duty cycle statistics.
3. Average power and maximum power at each frequency.
4. Raw analog-to-digital samples of the received signal.

Figure 5:
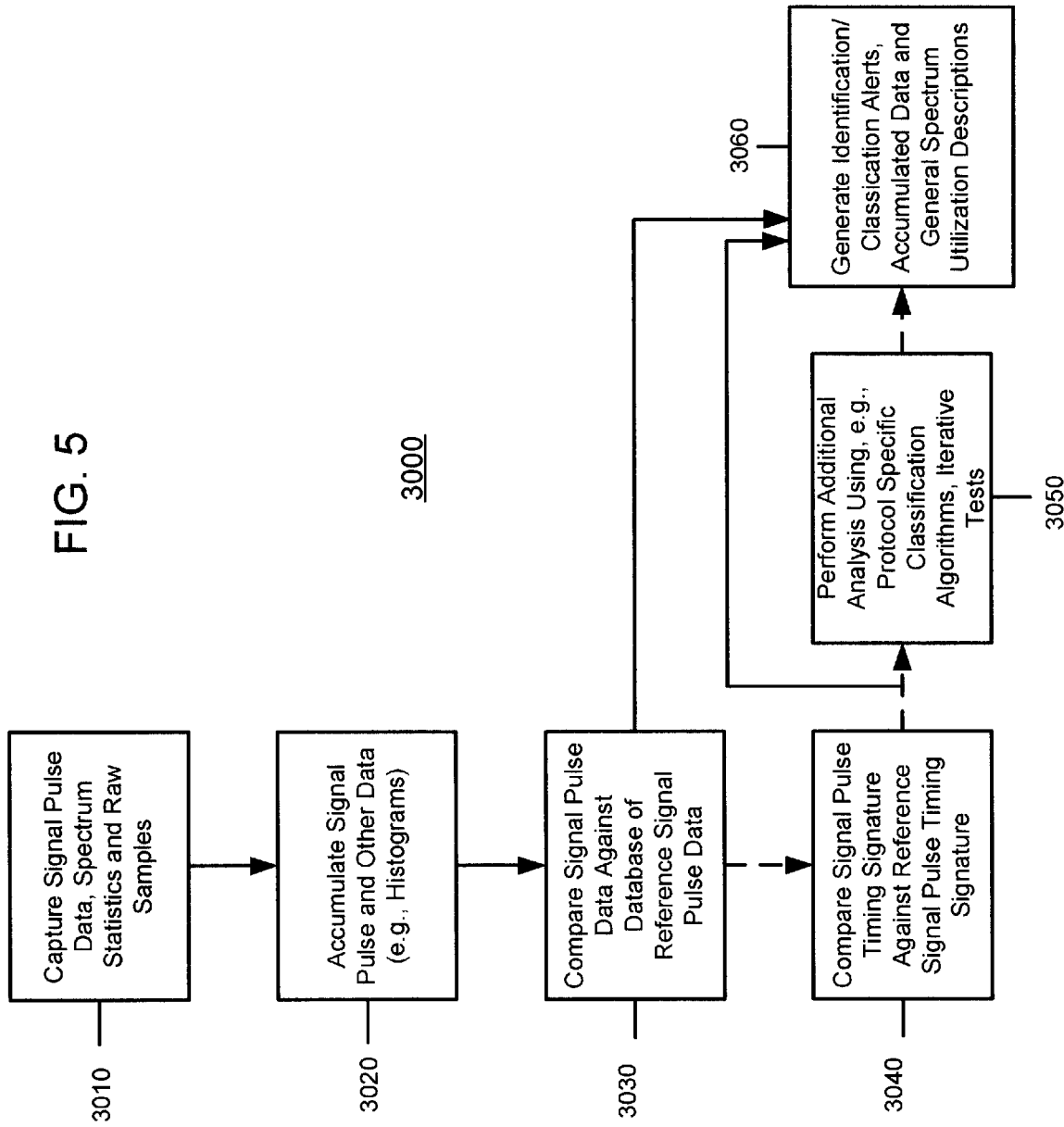
FIG. 5 is a flow chart depicting the various steps of the signal classification process.

With reference to the flow chart of FIG. 5, the signal classification process 3000 executed by the classification engine 500 will be generally described. In step 3010, the classification engine captures raw spectrum information, such as signal pulse data, duty cycle and other spectrum statistics, and raw snapshot samples (if any). In step 3020, the classification engine 500 accumulates signal pulse and other data from the raw spectrum information. The accumulated data may take the form of histograms, examples of which will be described hereinafter. In steps 3030 through 3050, the accumulated data is compared against fingerprints (profiles or reference data) for known signals.

The classification engine 500 uses device fingerprint definitions from a fingerprint database to compare with accumulated signal pulse data. A fingerprint definition includes signal descriptive information that identifies a device or a class of devices. A fingerprint definition may include:

1. Characteristics of a signal pulse: center frequency, pulse duration, bandwidth, time between pulses, etc.
2. Pulse timing signature template: definition of recurring pulse patterns, commonly related to a particular communication protocol or standard.
3. Iterative test definitions: iteratively search for specific signal characteristics.
4. Custom algorithms: specific algorithms which examine statistics and pulses looking for a specific device. These are usually communication protocol-specific programs.
5. "Expert" system analysis: more "intelligent" program to process historical statistics and pulse events over longer periods of time.
6. Techniques for analyzing snapshot samples for a specific preamble/codeword pattern.

In step 3030, the classification engine 500 compares the accumulated signal pulse data with reference data of known signals in the fingerprint database 610 and tries to classify the pulse(s). If the pulses can be classified by this comparison step, the process may jump to step 3060 and generate a signal identification alert. If the pulses cannot be classified based on the accumulated data alone, or if additional confirmation is desired, the process continues to step 3040, where pulse timing signatures derived from the pulse events are compared with pulse timing signature templates in the fingerprint database 610. If a match can be determined in step 3040, then the process jumps to step 3060, otherwise, the process continues to step 3050. In step 3050, additional algorithms or iterative tests can be performed that are designed to classify otherwise hard to match pulse types. For example, in some cases, fingerprinting may be enhanced by detecting the leading sync-word of a pulse. Raw ADC samples of the frequency spectrum are analyzed for matches with sync-word formats or patterns in the fingerprint database. An algorithm running on a standard microprocessor can classify most sync-words expected to be detected in the unlicensed frequency band. In step 3060, an identification/classification alert is generated for each signal that either classifies the signal or specifically identifies it. In addition, the power, duty cycle and center frequency (channel) information for each detected and/or identified pulse (referred to as general spectrum utilization descriptions) is output, as well as information generated by the spectrum analyzer (SA statistics) and the signal detector in the SAGE 400. An identification/classification alert may contain center frequency information (when relevant), a signal identification/classification (described above), a probability indicator, as a well as power and duty cycle information for the signal. The signal identification/classification information may indicate whether the signal is a microwave oven, frequency hopping signal (Bluetooth™ SCO or Bluetooth™ ACL, for example), cordless telephone, IEEE 802.11 signal, IEEE 802.15.3 device, or one of various radar types.

The order of the steps for the flowchart in FIG. 5 is not meant to be restrictive. For example, in some cases, it may be desirable to execute specific classification algorithms on signal pulse data first or early in the sequence of signal classification events.

Information used to build or compile a fingerprint definition is obtained from one or more of the following sources:

1. Industry standards or protocols, such as IEEE 802.11, Bluetooth™, IEEE 802.15.3, HomeRF™, etc.
2. Public filings with the U.S. Federal Communications Commission (FCC).
3. Public information from research publications.
4. Lab tests using a spectrum analyzer, duty cycle analyzer and/or vector analyzer.
5. Operations of spectrum analysis engine (e.g., SAGE 400 in FIG. 4) to obtain pulse event duty cycle and spectrum analyzer output information representative of various signals. See FIG. 14 and the accompanying description hereinafter.

Figure 6:
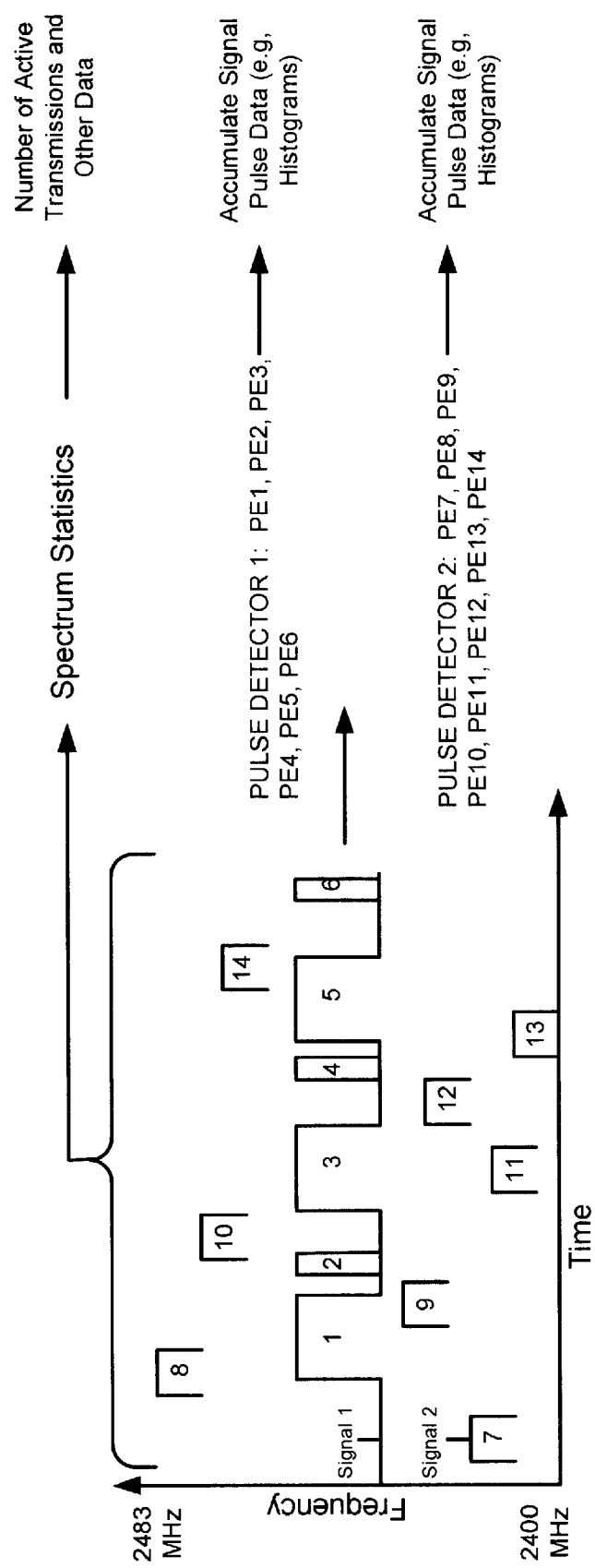
FIG. 6 is a graphical diagram illustrating exemplary signals that may occur in a frequency band and how data related to those signals is accumulated for input into the signal classification process.

FIG. 6 illustrates exemplary signal pulses of signals that may be present in the frequency band. There is IEEE 802.11b signal activity that consists of pulses 1–6. Pulses 1, 3 and 5 are the forward channel 802.11b transmissions and pulses 2, 4 and 6 are acknowledgement signals. There is also a frequency hopping signal, such as a Bluetooth™ SCO signal comprising pulses 7–14. The timing, strength and duration of the signals are not shown at precise scale. Pulse event information (pulse data) is generated for signal pulses 1–6, for example, by a pulse detector configured appropriately. Pulse event information is generated for signal pulses 7–14 by another pulse detector configured appropriately. The signal pulse data is accumulated over time for the two types of signals. The signal pulse data may be accumulated into various histograms to be described in conjunction with FIG. 7. In addition, spectrum analysis information may be derived from the signal activity in the frequency band, and this information can be used to generate, for example, the number of different transmissions that appear to be present in the frequency band at a given time period by counting the number of power values (above a threshold) at different frequencies in the band during the same time interval.

Examples of the pulse event data that is generated for exemplary pulses shown in FIG. 6 are provided below.

Pulse 1

SDID: 1 (identifying pulse detector 1)

Pulse Bandwidth: 11 MHz

Center Frequency: 37 MHz

Pulse Duration: 1.1 msec

Power: −75 dBm

Pulse 2

SDID: 1

Pulse Bandwidth: 11 MHz

Center Frequency: 37 MHz

Pulse Duration: 200 microsec

Power: −60 dBm

Though not listed above, also included in the information for each pulse is the start time of a pulse, thereby enabling computation of the time between consecutive pulses detected by a pulse detector.

The pulse event data for pulses 7–14 are very similar, with the exception of the center frequency. For example, pulses 7–14 may have a pulse bandwidth of 1 MHz, a pulse duration of 350 microsec, whereas the center frequency will vary across nearly all of the 2400 MHz to 2483 MHz frequency band. The SDID for pulses 7–14 is 2, since pulse detector 2 is configured to detect these types of pulses, for example.

Turning to FIG. 7, examples of the types of accumulated signal pulse data will be described. These examples of accumulated signal pulse data are histograms of pulse characteristics, but it should be understood that other ways to accumulate different types of signal pulse data may also be suitable. There is a center frequency histogram that tracks the percentage of time a given center frequency is observed for a signal pulse. For example, for a 256 FFT, there are 256 frequency bins that accumulate the amount of time (or number of events) that pulses occur at a particular frequency/frequencies. After a certain amount of time, each accumulated time in a frequency bin is divided by a total amount of time that the pulses were being transmitted, to generate a percentage at each frequency bin or frequency bins. Each frequency bin may be represented by a byte that ranges from 0 to 100 and represents the percent of time at that center frequency.

Similarly, there is a bandwidth histogram that tracks a given bandwidth observed for signal pulses. For example, if the entire bandwidth of the frequency band is 80 MHz, then there may be 80 1 MHz slots that are used to count the amount of time a pulse is at a particular bandwidth. Again, after a certain amount of time, each bandwidth count is divided by a total amount of time that the pulses were being transmitted in order generate a percentage value. For example, each byte bwPercent[N] represents the percentage of pulses having a bandwidth of N.

The pulse duration and time between pulses (also called pulse gap) observed for a signal pulse may be tracked with separate histograms that have generally the same form as shown in FIG. 7. There may be three categories of pulse duration and time between pulses: short, medium and long, partitioned by appropriate thresholds. The categories can be broken down as follows:

| Bin Size Type | Bin Start Range (microsec) | Individual Bin Size (microsec) | Number of Bins in Range | First Bin in Range (microsec) | Last Bin in Range (microsec) |
|---|---|---|---|---|---|
| Short | 0 to 190 | 10 | 20 | 0 to 9 | 190 to 199 |
| Medium | 200 to 1499 | 50 | 26 | 200 to 249 | 1450 to 1499 |
| Long | 1500 to 14500 | 500 | 27 | 1500 to 1999 | All times greater than 14500 |

Each of the bins represents the percentage of occurrences of gaps or durations within the range of that bin. The percentage values range from 0 to 100, with accuracy with ½ percentage point. For example, an 8-bit unsigned value from 0 to 200 can be used to represent the 0 to 100 percentage value.

Another data that can be generated and used for signal classification and other purposes is data that tracks the number of different simultaneous transmissions in the frequency band during a period of time. The active transmission histogram is an example of such data. It shows the percentage or time that one to 4 or more different signal transmissions were in progress during a sampling interval, based on the number of different pulses tracked by the 4 pulse detectors. It should be understood that 4 is only an example of the number of different pulses that could be simultaneously tracked. This type of data is very useful in determining when two or more signals of the same or different type are simultaneously active in the frequency band.

The reference signal pulse data against which the accumulated signal pulse data is compared, is similar in structure to the accumulated signal pulse data. The active transmission data is useful to classify signals that are simultaneously occurring in the frequency band; it is not generally part of the reference data for a particular signal type, but is useful intelligence to process the signal data.

FIGS. 8–11 are pictorial diagrams that represent accumulated signal pulse data in the form of histograms of individual pulse characteristics of known signals. These diagrams are merely representative of the underlying reference histogram data, and are not meant to represent how the data is stored and processed. FIG. 8 shows histograms for a frequency hopping signal device, such as a Bluetooth™ synchronous (SCO) packet. The center frequency histogram for this type of signal indicates that the center frequency may be anywhere in the frequency band with equal likelihood. The pulse duration histogram indicates that this signal is consistently approximately 400 microsec long. (This may fall into a short bin of pulse duration as explained above in conjunction with FIG. 7, if the pulse duration is represented that way.) The bandwidth histogram for this signal indicates that it is always approximately 1 MHz wide. Finally, the time between pulses histogram indicates that half the time, the pulse gap is very short, and the other half of the time, the pulse gap is approximately 3000 microsec. In order to match accumulated signal pulse data to a signal of this type, the match criteria (referred to hereinafter in conjunction with FIG. 12) may be quite rigid with respect to the pulse duration, bandwidth and time between pulses histograms.

FIG. 9 shows histogram data for a microwave oven. The center frequency histogram for this type of signal indicates that it is always at approximately one frequency, such as 40 MHz (in the 80 MHz wide 2.4 GHz unlicensed band). The pulse duration histogram indicates that it is always approximately 8 msec long. The bandwidth histogram indicates that the microwave oven pulse is always approximately 50 MHz wide. Finally, the time between pulses histogram indicates that it is always approximately 8 msec.

FIG. 10 shows histogram data for an IEEE 802.11b signal. Because an IEEE 802.11b signal could occur at any of several frequency channels in the frequency band, the center frequency histogram is not by itself very useful (unless prior knowledge is gained from general spectrum activity information that suggests there is 802.11 activity at a particular frequency channel). However, the bandwidth, pulse duration and time between pulses are useful, if not for classifying an 802.11 signal, then at least for a guide to suggest application of other signal classification techniques, such as a classification program or algorithm, described hereinafter.

Figure 11:
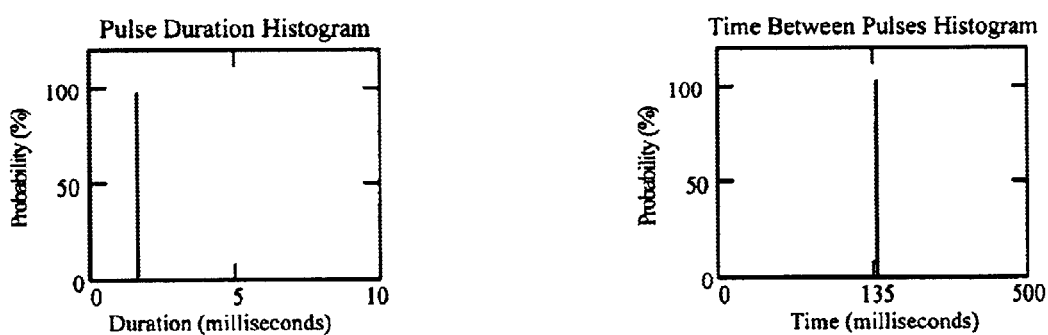

FIG. 11 shows histogram data for one type of a radar signal. This type of signal may have a pulse duration of approximately 2 msec and a time between pulses of 135 msec. For example, most radar devices emit a pulse for a single pulse duration and repeat at the same time duration between pulses. Thus, the pulse duration histogram and the time between pulses histogram are very useful in identifying a signal as radar.

Figure 12:
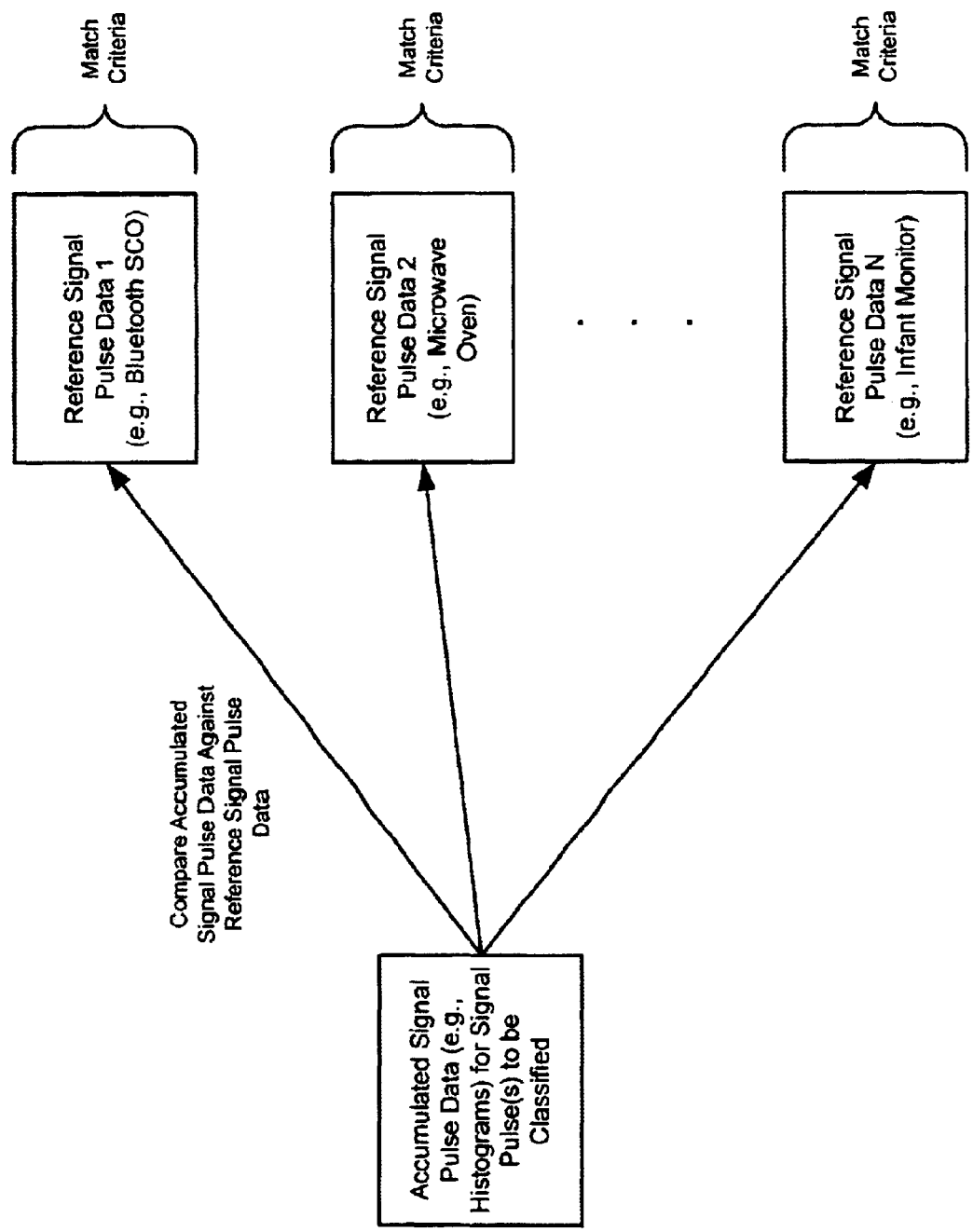
FIG. 12 is a diagram depicting how accumulated signal pulse data is compared with reference signal pulse data of known signals.

FIG. 12 depicts what is occurring during the comparison step 3030 in the flowchart of FIG. 5. The accumulated signal pulse data (e.g., histograms) for the signals to be classified are compared against reference or profile signal pulse data for known signals. Each histogram of the accumulated signal pulse data is compared against a like-kind histogram of the reference signal pulse data. The degree of match between the accumulated signal pulse data and the reference signal pulse data may be adjustable and or certain reference signal pulses, a very close match on certain pulse data must be found, as compared to other signal pulse data. To this end, each reference data set may have its own match criteria that must be satisfied in order to ultimately declare a match. For example, when comparing accumulated signal pulse data with reference data for a Bluetooth™ SCO signal, there must be very precise matches between the pulse duration, bandwidth and time between pulses histograms in order to declare a match. A scoring system may be used, where a numeric value is assigned to the comparison results between each signal characteristic. For certain signal types, if the total numeric value (e.g., total score) is at least as great as a certain value, then a match may be declared. An additional constraint may also require that certain signal characteristics must have a minimum degree of match.

Figure 13:
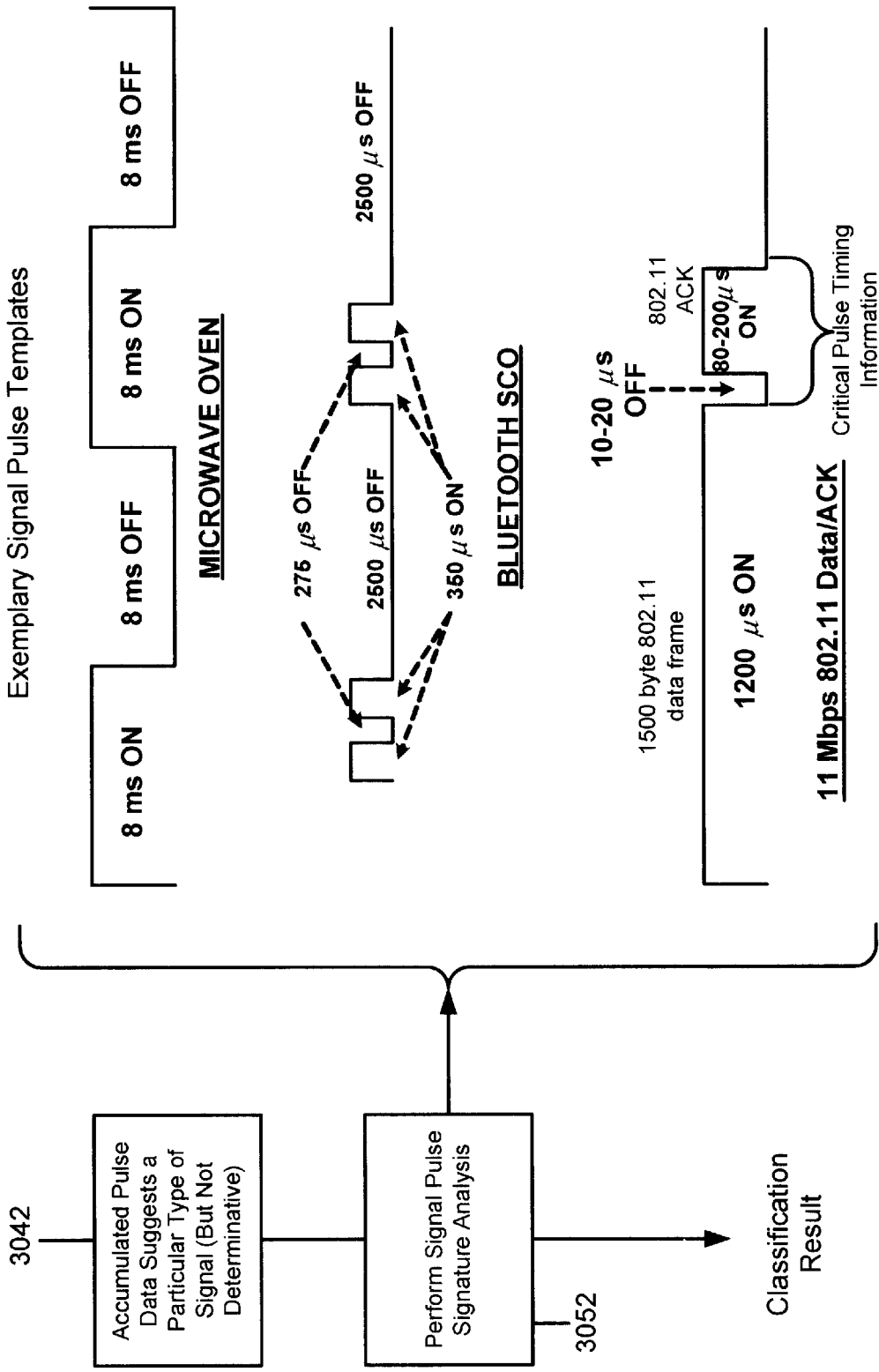
FIG. 13 is a diagram depicting how signal pulse timing signatures of unknown signals are compared against signal pulse timing signature templates of known signals for purposes of signal classification.

Pulse time signatures can provide a distinctive representation of a device or class of devices. In some cases, they can be used to confirm a suspected match with a particular signal type. FIG. 13 shows a process whereby in step 3042, the accumulated pulse data for a particular pulse suggests that it is of a particular type, but it is not determinative. For example, suggestive characteristics of an 802.11 signal is the presence of a signal pulse with a very short duration, no more than 200 microsec and a time between pulses of no more than 20 microsec. However, the additional data (center frequency and bandwidth) is not sufficient to confirm that it is an 802.11 signal. Therefore, in step 3052, pulse timing signature analysis (i.e., pattern) is performed on the pulse data. For example, the pulse timing analysis for an 802.11 signal is focused on identifying two signal pulses on the same center frequency separated from each other by no more than 20 microsec, and where the second signal pulse (an 802.11 ACK pulse) is no more than 200 microsec. The duration of the first pulse for an 802.11 is not particularly relevant to this analysis. A similar analysis may be performed on the pulse data against pulse signature information for a Bluetooth™ SCO signal. Classifying a pulse using timing signature templates is particularly useful when more than one device is transmitting in the frequency band. Pulse timing signature information for a signal can be represented by data describing the characteristic of a pulse, such as pulse duration, time between pulses, etc. This information can then compared against similar pulse timing signature information to determine whether there is a match.

Another way to iteratively search for different signal characteristics is to iteratively operate the pulse detectors in the SAGE with different parameters, with the goal of eventually detecting signal pulses that match the configured parameters of a pulse detector. The matching signal pulse characteristics are accumulated over time, and then run through the signal classification processes.

Figure 14:
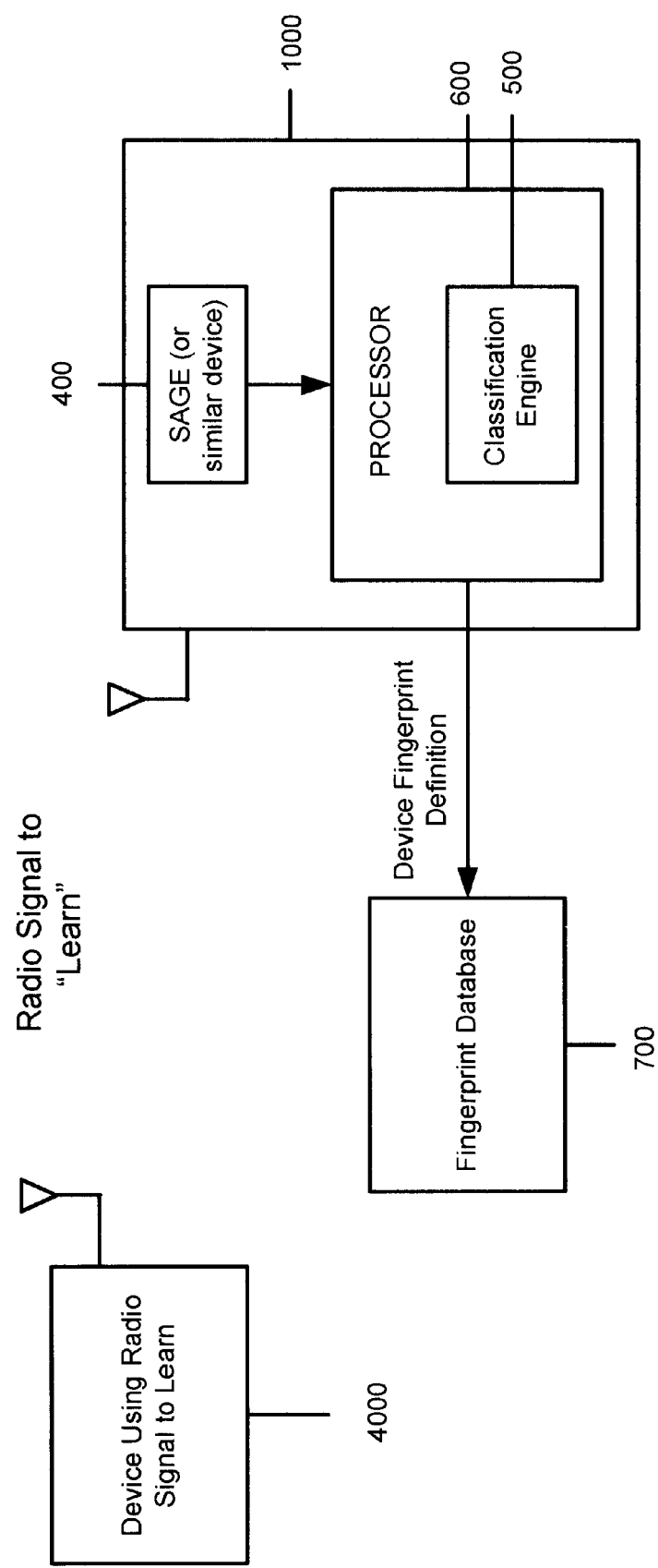
FIG. 14 is a block diagram showing how reference data for new signals can be generated for use in a signal classification process.

FIG. 14 illustrates an environment that is useful to learn the distinctive profile of a device and create a fingerprint definition. A device 4000 that transmits a radio signal to learn is turned on in an environment where a communication device 1000 having the SAGE 400 (or other device capable of providing similar output as the SAGE 400) resides. The communication device 1000 operates the SAGE 400 to generate signal pulse data, spectrum analysis statistics, etc., from the signal that it receives from the device 4000. This SAGE output may be processed by processor 600 executing the classification engine 500. The processor 600 may be part of the communication device 1000 using the SAGE 400, or may be located in another device remote from communication device 1000, such as in a server computer, for example. If located remotely, the SAGE outputs are transmitted wirelessly or by wire to processor 600. The classification engine 500 processes the SAGE outputs generated based on the transmission in the frequency band by the device 4000, accumulates signal pulse data (e.g., builds histograms) similar to the ones described above and uses those histograms as the appropriate set of fingerprint definitions to classify/identify the device 4000. Alternatively, the accumulated data can be used to design specific classification algorithms, pulse timing signature templates, etc., to classify/identify signals of the device 4000.

Figure 15:
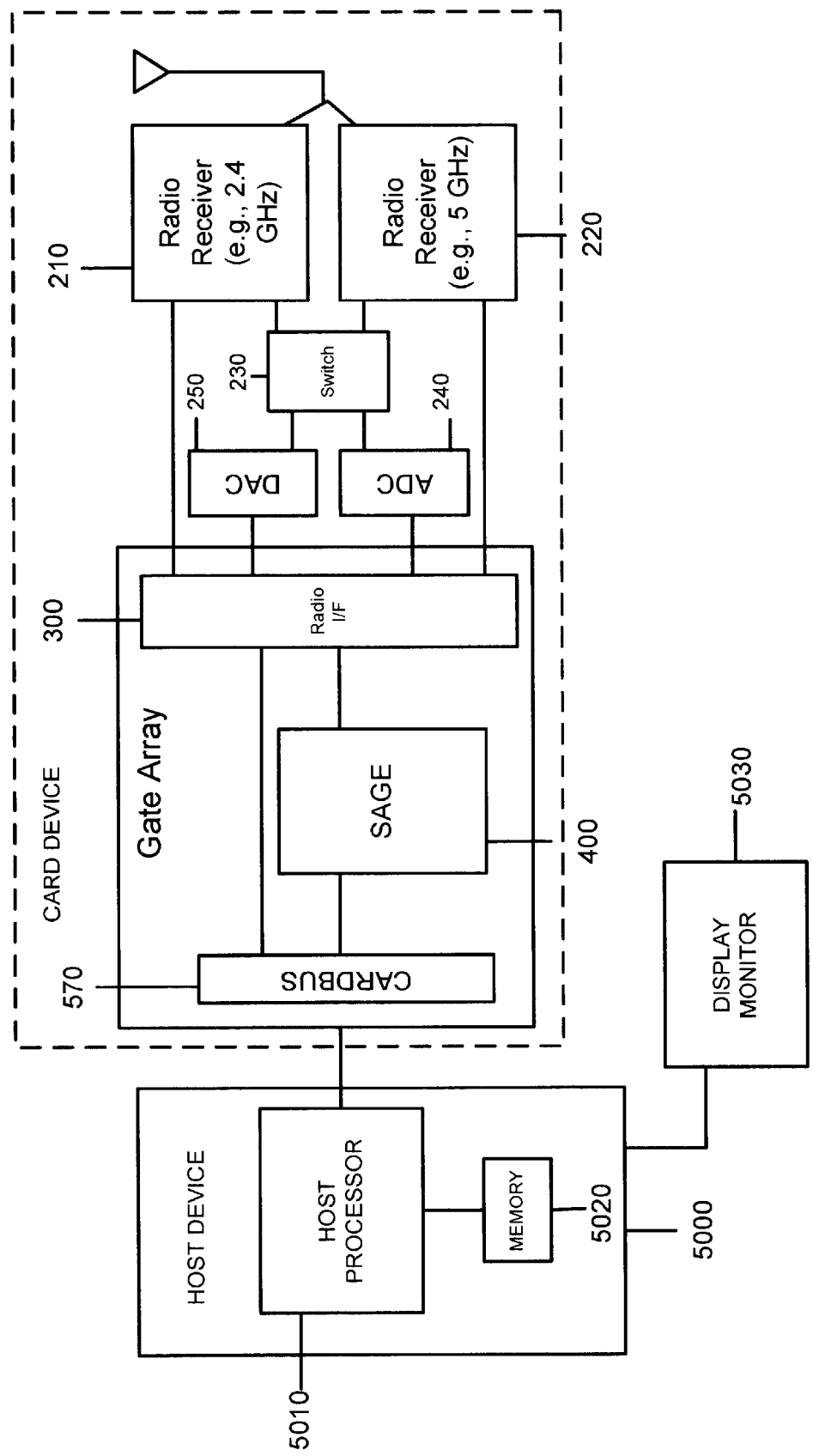
FIG. 15 is a block diagram showing another environment in which signal classification may be deployed.

FIG. 15 illustrates another example of an application of the signal classification schemes. In this example, the SAGE 400 or other device capable of generating signal pulse data is deployed together with the radio I/F 300 and an interface, such as a cardbus interface 570. These components may be implemented in a field programmable gate array together with the cardbus interface 570. The cardbus interface 570 may interface with various card-slot types, such as Type II PC-Card slot. The SAGE 400 is used by a host device 5000 that has a host processor 5010 as well as other components. A display monitor 5030 may be coupled to the host device 5000. The host device 1000 may be, for example, an access point for a wireless local area network, in which case it would have the requisite radio transceiver and baseband signal processing components. Alternatively, the host device 5000 may be a desktop or notebook personal computer or personal digital assistant. A memory 5020 in the host device may store a software. programs for controlling the use of the SAGE 400 as well as the classification engine program. In addition, the memory 5020 may store driver software for the host device, such as drivers for operating systems such as Windows operating systems (Windows® XP, Windows® CE, etc.).

One or more radio receivers may be coupled to the radio I/F 300. For example, one radio receiver 210 may be dedicated to one frequency band (such as the 2.4 GHz unlicensed band) and another radio receiver 220 may be dedicated to another frequency band (such as the 5 GHz unlicensed bands). A switch 230 selects the baseband analog output from one of the radio receivers, and couples it to an ADC 240, which is in turn coupled to the radio I/F 300. The DAC 250 is used to couple control signals to the radio receivers to, for example, control the bandwidth of operation of the radio receiver for wideband or narrowband operation. The larger dotted block around the elements in FIG. 15 is meant to indicate that these components may reside in a card device, such as a PC-card device, that interfaces with the host device 5000. Thus, the card device essentially is a spectrum analyzer device and much more for a radio frequency band, that interfaces to a host device 5000.

Figure 16:
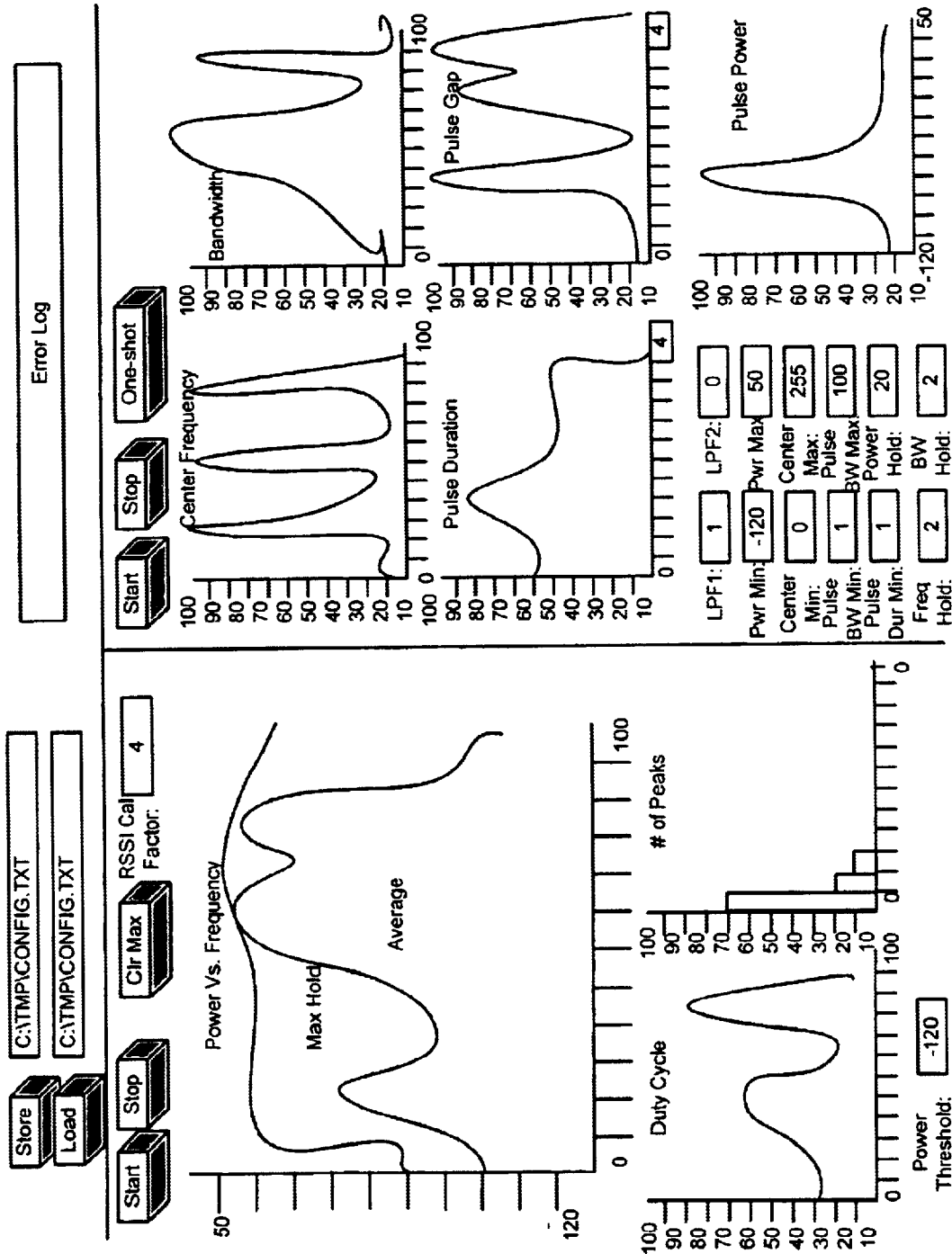
FIG. 16 is a graphical diagram showing exemplary output that may accompany signal classification output.

The host processor 5010 performs the functions to control, and interface with, the SAGE 400, as well as other functions, such as executing the classification engine based on the output of the SAGE 400. In addition, another application program residing in the memory 5020 of the host device 5000 may generate a graphic user interface display of the SAGE and/or classification engine output, as shown in FIG. 16. In addition, there may controls to trigger display of newly captured data as shown by the buttons at the top of FIG. 16.

Moreover, the radio I/F 300 and SAGE 400 are shown in phantom to indicate that all of the functions of these components may be performed by a software program stored in the memory 910 and executed by the host processor 900. In this configuration, the output of the ADC 240 is coupled through an interface, such as the cardbus interface 570 to the host processor 5010, which executes processes that would otherwise be performed in hardware by the SAGE 400, as well as the classification engine and other processes referred to above.

In sum, a method is provided for classifying signals occurring in a frequency band, comprising detecting one or more characteristics of one or more signals in the frequency band; accumulating signal data pertaining to the signals over time; comparing the signal data against reference data associated with known signals; and classifying the one or more signals in the frequency band based on the comparison. Similarly, a system is provided for classifying signals occurring in a frequency band, comprising: a memory that stores accumulated signal data pertaining to signals occurring in the frequency band over time; and a processor coupled to the memory that compares the accumulated signal data against reference data to classify the one or more signals in the frequency band.

Moreover, a method is provided for generating data indicative of a signal of a device operating in a frequency band, comprising steps of detecting a signal transmitted by the device operating in the frequency band; accumulating signal data pertaining the signal over time; and generating characteristics of the signal data useful to classify or identify the device when it operates in the frequency band.

Further still, a processor readable medium is provided that is encoded with instructions that, when executed by a processor, cause the processor to perform the steps of comparing signal data against reference data associated with known signals; and classifying the one or more signals in the frequency band based on the comparison.

The above description is intended by way of example only.

What is claimed is:

1. A method for classifying signals occurring in a frequency band, comprising:
   a. detecting signal pulses associated with one or more signals in the frequency band;
   b. accumulating signal pulse data pertaining to detection of the signal pulses over time, the signal pulse data comprising one or more of: pulse center frequency, pulse bandwidth, pulse duration, time between pulses and number of different signal pulses detected; and
   c. analyzing the signal pulse data with respect to data associated with known signals to classify the one or more signals occurring in the frequency band.

2. The method of claim 1, wherein the step of detecting comprises detecting signal pulses associated with the one or more signals in the frequency band.

3. The method of claim 1, wherein the step of analyzing comprises analyzing the signal pulse data against definition data that includes signal descriptive information associated with known signal pulses.

4. The method of claim 3, wherein the step of analyzing comprises determining a degree of match between one or more characteristics of the signal pulse data with the data associated with known signals.

5. The method of claim 3, and further comprising assigning for a known signal, match criteria between characteristics of the data associated with a known signal and corresponding characteristics in the accumulated signal pulse data that must be met in order to declare a match.

6. The method of claim 3, wherein the step of analyzing comprises analyzing the signal pulse data against definition data, wherein the definition data comprises one or more of: (1) characteristics of signal pulse data including one or more of center frequency, pulse duration, bandwidth and time between pulses; (2) definition of recurring pulse patterns common to a particular communication protocol or standard; (3) iterative test definitions that search for specific signal pulse data characteristics; (4) algorithms that examine statistics and pulse types for a specific device; and (5) algorithms that process historical statistics derived from the signal pulse data over relatively longer periods of time.

7. The method of claim 3, wherein the steps of detecting, accumulating and analyzing are performed in a first device, and further comprising the step of receiving definition data from a second device for use by the first device in performing the step of classifying.

8. The method of claim 1, wherein the step of accumulating data comprises accumulating histograms for the one or more characteristics.

9. The method of claim 8, wherein the step of accumulating data comprises accumulating one or more histograms including: a center frequency histogram that tracks a percentage of time a given center frequency was observed for detected signal pulses, a bandwidth histogram that tracks the percentage of time a given bandwidth was observed for detected signal pulses, a pulse duration histogram that tracks a percentage of time a given duration or durations was observed for detected signal pulses, a time between pulses histogram that tracks percentage of time that a given time duration or durations was observed between detected signal pulses and a number of active transmissions histogram that tracks a percentage of time that a given number of signal transmissions was observed.

10. The method of claim 1, and further comprising the step of obtaining raw samples of received energy for a time interval, wherein the step of analyzing further comprises analyzing the raw samples.

11. The method of claim 10, wherein the step of classifying comprises analyzing the raw samples to determine if they sufficiently match a synchronization portion of a known communication signal.

12. The method of claim 1, wherein the step of detecting comprises iterating through a plurality of different signal pulse characteristics for time intervals to detect signals in the frequency band that meet one or more of the plurality of different signal pulse characteristics.

13. The method of claim 1, wherein the step of classifying further comprises outputting, for a signal that can be classified, information that describes the type of signal, as well as one or more of: a center frequency of the signal, if relevant, a measure of probability that there is a match, power of the signal and duty cycle of the signal.

14. The method of claim 1, wherein the step of analyzing comprises analyzing the signal pulse data with data describing patterns associated with known signals.

15. The method of claim 14, wherein the step of analyzing comprises analyzing the signal pulse data for recurring signal pulse patterns.

16. The method of claim 15, wherein the step of analyzing comprises analyzing the signal pulse data for a time period between successive signal pulses.

17. The method of claim 1, wherein the step of detecting comprises detecting, from data representing received energy in the frequency band, signal pulses that fall within a range of one or more of: bandwidth, duration, and center frequency.

18. The method of claim 17, wherein the step of accumulating comprises accumulating pulse event data associated with signal pulses occurring in the frequency band that are determined to fall within a range of one or more of: bandwidth, duration, and center frequency.

19. The method of claim 18, wherein the step of detecting comprises detecting, from the data representing received energy in the frequency band, multiple types of signal pulses that may be simultaneously occurring in the frequency band and that fall within a corresponding range of one or more of: bandwidth, duration, and center frequency.

20. A system for classifying signals occurring in a frequency band, comprising:
  a. a memory that stores accumulated signal pulse data comprising one or more of: pulse center frequency, pulse bandwidth, pulse duration and time between pulses for signal pulses detected in the frequency band over time; and
  b. a processor coupled to the memory that analyzes the accumulated signal pulse data with respect to data associated with known signals to classify one or more signals occurring in the frequency band.

21. The system of claim 20, wherein the processor analyzes the accumulated signal pulse data with respect to definition data that includes signal descriptive information associated with known signals.

22. The method of claim 21, wherein the processor analyzes the signal pulse data against definition data, wherein the definition data comprises one or more of: (1) characteristics of signal pulse data including one or more of center frequency, pulse duration, bandwidth and time between pulses; (2) definition of recurring pulse patterns common to a particular communication protocol or standard; (3) iterative test definitions that search for specific signal pulse data characteristics; (4) algorithms that examine statistics and pulse types for a specific device; and (5) algorithms that process historical statistics derived from the signal pulse data over relatively longer periods of time.

23. The system of claim 20, wherein the memory stores accumulated data comprising histograms for the one or more characteristics.

24. The system of claim 23, wherein the memory stores accumulated data comprising histograms selected from the group consisting of: a center frequency histogram that tracks a percentage of time a given center frequency was observed for a signal pulse, a bandwidth histogram that tracks the percentage of time a given bandwidth was observed for a signal pulse, a pulse duration histogram that tracks a percentage of time a given duration was observed for a signal pulse, time between pulses histogram that tracks a percentage of time that a given time duration or durations was observed between signal pulses and a number of active transmissions histogram that tracks a percentage of time that a given number of different signal transmissions was observed.

25. The system of claim 20, wherein the processor further analyzes raw samples of received energy for a time interval.

26. The system of claim 25, wherein the processor analyzes the raw samples to determine if they sufficiently match a synchronization portion of a known communication signal.

27. The system of claim 20, and further comprising one or more pulse detector circuits that detect signal pulses having characteristics that fall within a range of one or more of: bandwidth, center frequency band and duration.

28. The system of claim 27, wherein the processor changes parameters of the one or more pulse detector circuits to detect signals pulses of different characteristics.

29. The system of claim 27, and comprising a plurality of pulse detector circuits each of which detects signal pulses that have characteristics that fall within a corresponding range of one or more of: bandwidth, center frequency band and duration, so as to detect multiple types of signal pulses that may be simultaneously occurring in the frequency band.

30. The system of claim 20, wherein the memory resides in a first device and the processor resides in a second device, and wherein the first device transmits the accumulated signal pulse data to the second device for processing by the processor.

31. The system of claim 20, and further comprising a spectrum analysis device that generates signal pulse data pertaining to signals occurring in the frequency band and outputs the signal pulse data to the memory.

32. The system of claim 31, and further comprising a radio receiver that receives signals occurring in the frequency band and outputs baseband signals representative thereof to the spectrum analysis device.

33. The system of claim 32, wherein the spectrum analysis device and the radio receiver are implemented in a card device, and wherein the processor is included in a host device coupled to the card device.

34. The system of claim 20, wherein the processor generates as output for a signal that can be classified, information that describes the type of signal, as well as one or more of: a center frequency of the signal, if relevant, a measure of probability that there is a signal match, power of the signal and duty cycle of the signal.

35. The system of claim 20, wherein the processor compares the signal pulse data with data describing a time period between successive signal pulses associated with a known signal.

36. A method for generating data indicative of a signal of a device operating in a frequency band, comprising steps of:
  a. detecting signal pulses associated with signals transmitted by the device operating in the frequency band;
  b. accumulating signal pulse data pertaining to the detected signal pulses over time, the signal pulse data comprising one or more of: pulse center frequency, pulse bandwidth, pulse duration, time between pulses and number of different active transmissions; and c. generating from the accumulated signal pulse data signal classification definition data useful to classify or identify the device when it operates in the frequency band.

37. The method of claim 36, wherein the step of accumulating data comprises accumulating one or more histograms selected from the group consisting of: a center frequency histogram that tracks a percentage of time a given center frequency was observed for a signal pulse, a bandwidth histogram that tracks the percentage of time a given bandwidth was observed for a signal pulse, a pulse duration histogram that tracks a percentage of time a given duration was observed for a signal pulse, a time between pulses histogram that tracks a percentage of time that a given time duration or durations was observed between signal pulses and a number of active transmissions histogram that tracks a percentage of time that a given number of different signal transmissions was observed.

38. The method of claim 36, and further comprising the step of defining match criteria between the definition data and signal pulse data of a detected signal in order to declare that the detected signal is a match.

39. A processor readable medium encoded with instructions that, when executed by a processor, cause the processor to perform the steps of:

a. accumulating signal pulse data pertaining to detection of signal pulses associated with one or more signals occurring in a frequency band, the signal pulse data comprising one or more of: signal pulse center frequency, signal pulse bandwidth, signal pulse duration, time between signal pulses and number of different signal pulses detected in the frequency band; and b. classifying the one or more signals in the frequency band by analyzing the signal pulse data with respect to data associated with known signals.

40. The medium of claim 39, wherein the instructions encoded on the medium to perform the classifying step comprise instructions for analyzing the accumulated signal pulse data with respect to definition data that includes signal descriptive information associated with known signals derived from one or more of: pulse center frequency, pulse bandwidth, pulse duration and time between pulses.

41. The medium of claim 40, wherein the instructions encoded on the medium to perform the classifying step comprise instructions for analyzing the signal pulse data against definition data, wherein the definition data comprises one or more of: (1) characteristics of signal pulse data including one or more of center frequency, pulse duration, bandwidth and time between pulses; (2) definition of recurring pulse patterns common to a particular communication protocol or standard; (3) iterative test definitions that search for specific signal pulse data characteristics; (4) algorithms that examine statistics and pulse types for a specific device; and (5) algorithms that process historical statistics derived from the signal pulse data over relatively longer periods of time.

42. The medium of claim 39, wherein the instructions encoded on the medium to perform the classifying step comprise instructions for determining a degree of match between one or more characteristics of the signal pulse data with the data associated with known signals.

43. The memory medium of claim 42, and further comprising instructions encoded on the medium for assigning match criteria between characteristics of the data associated with known signals and signal pulse data that must be met in order to declare a match.

44. The medium of claim 39, and further comprising instructions encoded on the medium for analyzing raw samples of received energy for a time interval in order to classify the signal.

45. The medium of claim 44, and further comprising instructions encoded on the medium for analyzing the raw samples to determine if they sufficiently match a synchronization portion of a known communication signal.

46. The memory medium of claim 39, and further comprising instructions encoded on the medium for outputting, for a signal that can be classified, information that describes the type of signal, as well as one or more of: a center frequency of the signal, if relevant, a measure of probability that the signal matches the identifier, power of the signal and duty cycle of the signal.

47. The medium of claim 35, and further comprising instructions encoded on the medium that cause the processor to generate the signal pulse data.

48. The medium of claim 47, wherein the instructions encoded on the medium for performing the step of detecting comprises instructions for detecting from data representing received energy in the frequency band, multiple types of signal pulses that may be simultaneously occurring in the frequency band and that fall within a corresponding range of one or more of: bandwidth, duration, and center frequency.

49. The medium of claim 39, wherein the instructions encoded on the medium for performing the step of comparing comprise instructions for comparing the signal pulse data with data describing a time period between successive signal pulses associated with a known signal.

50. The medium of claim 39, wherein the instructions encoded on the medium for performing the step of accumulating comprise instructions for accumulating pulse event data associated with signal pulses occurring in the frequency band that are determined to fall within a range of one or more of: bandwidth, duration, and center frequency.

51. A system for classifying signals occurring in a frequency band, comprising:

a. a radio receiver that receives signals occurring in the frequency band and outputs signals representative thereof;

b. a spectrum analysis device that generates signal pulse data pertaining to signals occurring in the frequency band based on the signals output by the radio receiver;

c. a memory that stores accumulated signal pulse data pertaining to signals occurring in the frequency band over time that is output by the spectrum analysis device; and d. a processor coupled to the memory that analyzes the accumulated signal pulse data to classify one or more signals occurring in the frequency band;

e. wherein the spectrum analysis device and the radio receiver are implemented in a card device, and wherein the processor is included in a host device coupled to the card device.

52. The system of claim 51, wherein the spectrum analysis device detects, from signals output of the radio receiver, signal pulses that fall within a range of one or more of: bandwidth, duration, and center frequency, and outputs signal pulse data for signal pulses that fall within such ranges.

53. The system of claim 52, wherein the processor accumulates the signal pulse data, the signal pulse data comprising one or more of: pulse center frequency, pulse bandwidth, pulse duration, time between pulses and number of different signal pulses detected.

54. The system of claim 53, wherein the processor analyzes the signal pulse data with respect to definition data that includes signal descriptive information associated with known signal pulses.

55. The system of claim 54, wherein the processor analyzes the signal pulse data against definition data, wherein the definition data comprises one or more of: (1) characteristics of signal pulse data including one or more of center frequency, pulse duration, bandwidth and time between pulses; (2) definition of recurring pulse patterns common to a particular communication protocol or standard; (3) iterative test definitions that search for specific signal pulse data characteristics; (4) algorithms that examine statistics and pulse types for a specific device; and (5) algorithms that process historical statistics derived from the signal pulse data over relatively longer periods of time.

56. The system of claim 51, wherein the processor further analyzes raw samples of received energy for a time interval.

57. The system of claim 56, wherein the processor analyzes the raw samples to determine if they sufficiently match a synchronization portion of a known communication signal.

58. The system of claim 51, wherein the processor generates as output for a signal that can be classified, information that describes the type of signal, as well as one or more of: a center frequency of the signal, if relevant, a measure of probability that there is a signal match, power of the signal and duty cycle of the signal.

* * * * *

UNITED STATES PATENT AND TRADEMARK OFFICE
CERTIFICATE OF CORRECTION

PATENT NO. : 6,850,735 B2
DATED : February 1, 2005
INVENTOR(S) : Gray L. Sugar, Neil R. Diener and Karl A. Miller It is certified that error appears in the above-identified patent and that said Letters Patent is hereby corrected as shown below:

<u>Title page, Item [54] and Column 1, line 2,</u>
Title, replace "CLASSICIATION" with -- CLASSIFICATION --.

<u>Column 3,</u>
Line 61, replace "classifieds" with -- classifies --.

<u>Column 9,</u>
Line 33, replace "or" with -- for --.

<u>Column 10,</u>
Line 9, insert -- be -- between "then" and "compared".

<u>Column 16,</u>
Line 10, change "35" to -- 39 --.

Signed and Sealed this

Third Day of May, 2005

JON W. DUDAS
*Director of the United States Patent and Trademark Office*